United States Patent
Goto et al.

(10) Patent No.: US 12,192,786 B2
(45) Date of Patent: Jan. 7, 2025

(54) DIAGNOSIS OF OPERATION OF PLURAL COMMUNICATING UNITS

(71) Applicant: SONY GROUP CORPORATION, Tokyo (JP)

(72) Inventors: Jungo Goto, Tokyo (JP); Yasuo Kubo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 359 days.

(21) Appl. No.: 17/423,015

(22) PCT Filed: Jan. 24, 2019

(86) PCT No.: PCT/JP2019/002159
§ 371 (c)(1),
(2) Date: Jul. 14, 2021

(87) PCT Pub. No.: WO2020/152812
PCT Pub. Date: Jul. 30, 2020

(65) Prior Publication Data
US 2022/0078633 A1    Mar. 10, 2022

(51) Int. Cl.
H04W 16/28 (2009.01)
H04B 7/08 (2006.01)
H04W 24/04 (2009.01)

(52) U.S. Cl.
CPC .............. *H04W 16/28* (2013.01); *H04B 7/08* (2013.01); *H04W 24/04* (2013.01)

(58) Field of Classification Search
CPC ........ H04W 16/28; H04W 24/04; H04B 7/08; H04B 7/0404; H04B 7/088; H04B 7/0695; H04B 17/23; H04B 17/29

(Continued)

(56) References Cited

U.S. PATENT DOCUMENTS

2009/0295648 A1* 12/2009 Dorsey .................. H01Q 21/28
  343/702
2009/0325528 A1* 12/2009 Yokota ................. H04B 7/0805
  455/277.1

(Continued)

FOREIGN PATENT DOCUMENTS

CN   102387523 A   3/2012
CN   104601195 A   5/2015

(Continued)

OTHER PUBLICATIONS

International Search Report and Written Opinion of PCT Application No. PCT/JP2019/002159, issued on Apr. 9, 2019, 6 pages of ISRWO.

(Continued)

*Primary Examiner* — Michael Y Mapa
(74) *Attorney, Agent, or Firm* — CHIP LAW GROUP

(57) ABSTRACT

Provided is a communicating device including plural communicating units each communicates with another communicating device via a wireless communication path, a casing that supports the plural communicating units such that the plural communicating units respectively receive radio signals arriving from directions relatively different from each other, and a communication control section that controls operation of each of the plural communicating units, the communication control section performing control such that priority is given to reception of a radio signal by a target communicating unit among the plural communicating units and controlling execution of processing related to diagnosis of communicating unit in question, on basis of a result of the reception.

14 Claims, 13 Drawing Sheets

(58) Field of Classification Search
USPC ...... 370/328, 334; 455/13.3, 25, 63.4, 562.1
See application file for complete search history.

(56) References Cited

U.S. PATENT DOCUMENTS

| | | | | |
|---|---|---|---|---|
| 2015/0078189 | A1* | 3/2015 | Kwon | .................. H04W 24/08 |
| | | | | 370/252 |
| 2018/0084131 | A1* | 3/2018 | Hashimoto | ........... G06F 3/1229 |
| 2018/0287651 | A1 | 10/2018 | Fernando et al. | |
| 2018/0302138 | A1 | 10/2018 | Shirakata et al. | |
| 2021/0105052 | A1 | 4/2021 | Shirakata et al. | |

FOREIGN PATENT DOCUMENTS

| | | |
|---|---|---|
| CN | 107950046 A | 4/2018 |
| CN | 108604921 A | 9/2018 |
| CN | 110463074 A | 11/2019 |
| EP | 3416301 A1 | 12/2018 |
| EP | 3602830 A1 | 2/2020 |
| EP | 3896868 A1 | 10/2021 |
| JP | 2002-009714 A | 1/2002 |
| JP | 2007-288257 A | 11/2007 |
| JP | 2016-054372 A | 4/2016 |
| JP | 2017-143467 A | 8/2017 |
| JP | 6847581 B2 | 3/2021 |
| TW | 201729552 A | 8/2017 |
| WO | 2017/138051 A1 | 8/2017 |
| WO | WO-2018008212 A1 | 1/2018 |
| WO | 2018/183573 A1 | 10/2018 |

OTHER PUBLICATIONS

"3rd Generation Partnership Project; Technical Specification Group Radio Access Network;NR; User Equipment (UE) radio transmission and reception; Part 2: Range 2 Standalone (Release 15)", 3GPP TS 38.101-2, V15.3.0, Sep. 2018, 106 pages.

"Study on channel model for frequencies from 0.5 to 100 GHZ (Release 15)", 3rd Generation Partnership Project; Technical Specification Group Radio Access Network, 3GPP TR 38.901, V15.0.0, Jun. 2018, 91 pages.

Extended European Search Report of EP Application No. 19911700.3, issued on Dec. 14, 2021, 8 pages.

* cited by examiner

F I G. 4
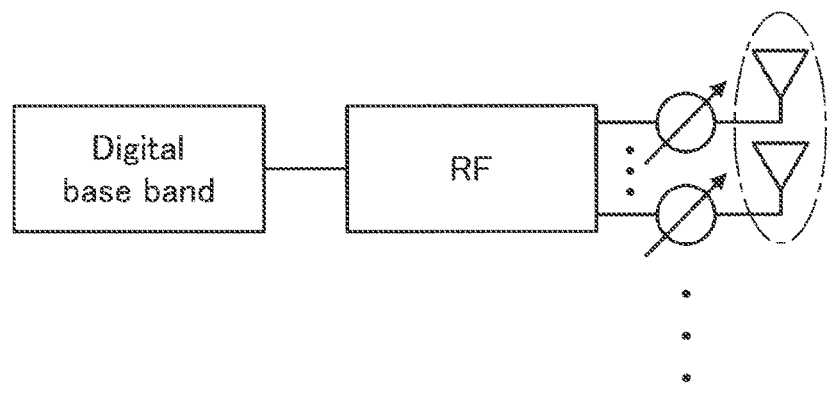
F I G. 5
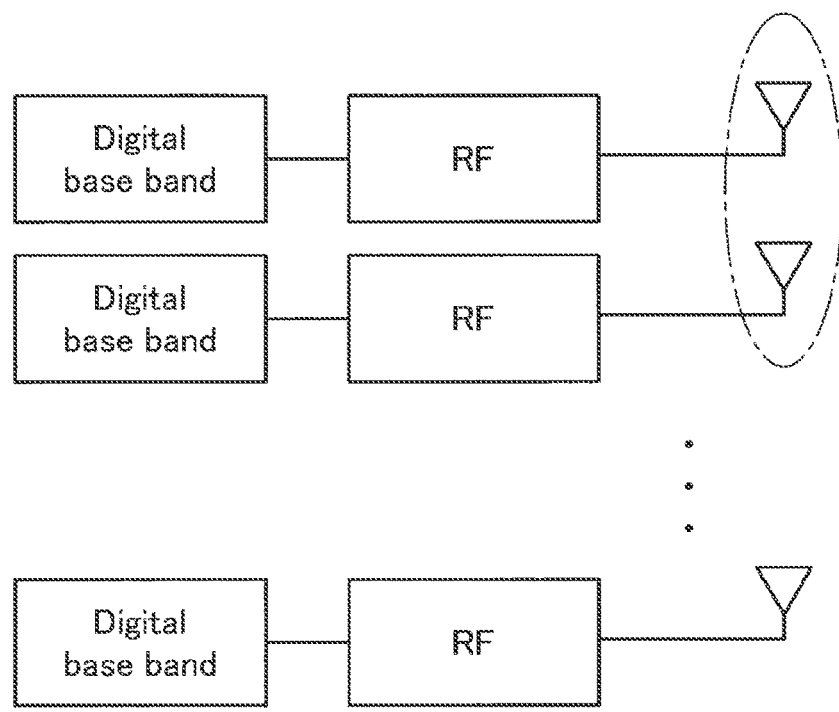

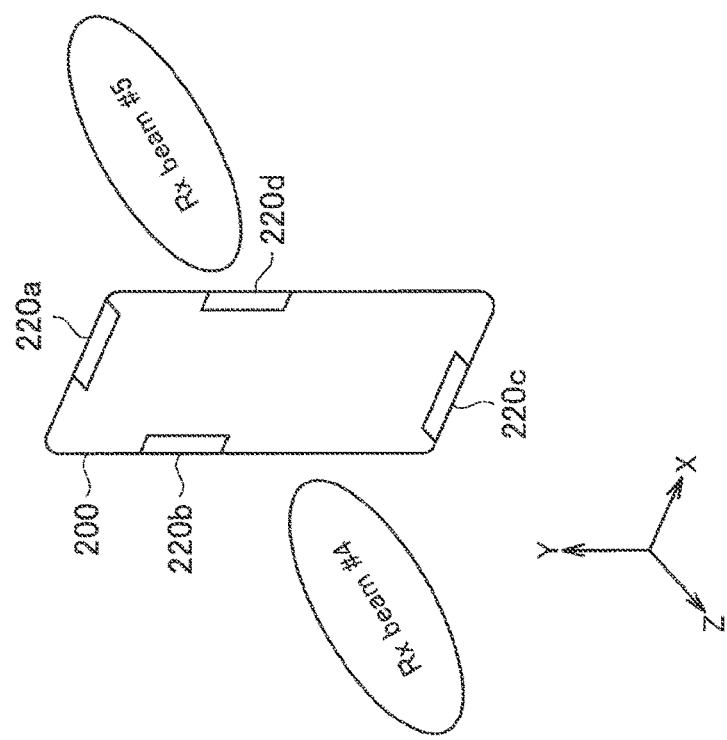
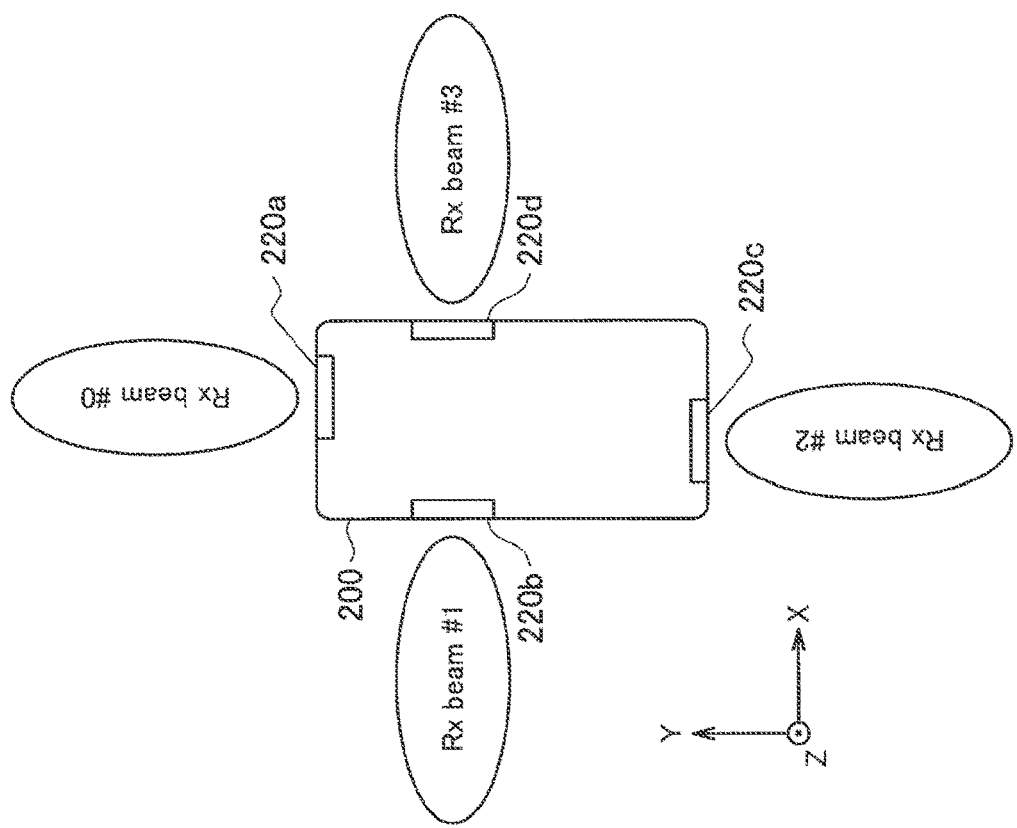
FIG. 6

DIAGNOSIS OF OPERATION OF PLURAL COMMUNICATING UNITS

CROSS REFERENCE TO RELATED APPLICATIONS

This application is a U.S. National Phase of International Patent Application No. PCT/JP2019/002159 filed on Jan. 24, 2019. Each of the above-referenced applications is hereby incorporated herein by reference in its entirety.

TECHNICAL FIELD

The present disclosure relates to a communicating device, a control device, and a control method.

BACKGROUND ART

In recent years, various studies have been conducted in regard to a fifth generation (5G) mobile communication system following LTE/LTE-A. In 5G, standardization is under way to realize high-capacity communication of 10 to 20 Gbps by broad-band transmission using a frequency band even higher than that in 4G (LTE). A conventional cellular system provides a service area for dealing with the mobility of terminal devices in a planar manner. However, when a frequency band even higher than a frequency band used in 4G is used, it may be difficult to meet a conventional coverage. Because of a narrow coverage as well as very strong straightness in a frequency band higher than 6 GHZ, in particular, a transmitting and receiving device may be out of sight due to blocking by a building, a person, a vehicle, or the like, and it may be difficult to obtain sufficient radio field intensity. Therefore, a very high throughput is expected to be realized within the coverage of the frequency band higher than 6 GHz while a coverage is secured by combination with a band equal to or lower than the 6 GHz band. NPL 1 and NPL 2, for example, disclose the usage of a frequency band such as what is generally called a millimeter waveband or the like in 5G which frequency band is even higher than the frequency band used in 4G.

As described above, in the case of using the frequency band higher than 6 GHZ, not only is there a large propagation loss, but also there is a possibility of communication quality being significantly degraded by the presence of a moving blocking object such as a person or a vehicle, so that it may be difficult to realize stable communication. With such conditions assumed, communication quality at a time of transmission and reception of data may be ensured by providing plural communicating units (for example, antenna modules) to a terminal device, for example, and selectively changing a communicating unit to be used and a beam pattern to be applied.

CITATION LIST

Patent Literature

[NPL 1]
3GPP TS38.101-2 V15.3.0 (2018-09), "NR; User Equipment (UE) radio transmission and reception; Part2: Range 2 Standalone (Release 15)," October 2018, [retrieved on Dec. 26, 2018] the Internet <URL: http://www.3gpp.org/ftp/Specs/archive/38_series/38.101-2/38101-2-f30.zip>
[NPL 2]
3GPP TR38.901 V15.0.0 (2018-06), "Study on channel model for frequencies from 0.5 to 100 GHZ (Release 15)," June 2018, [retrieved on Dec. 26, 2018] the Internet <URL: http://www.3gpp.org/ftp/Specs/archive/38_series/38.901/38901-f00.zip>

SUMMARY

Technical Problem

On the other hand, under such conditions that a communicating unit to be used for communication is selectively changed among the plural communicating units, even when it becomes difficult for a part of the communicating units to operate due to a failure or the like, communication may be enabled by using another communicating unit. In addition, in a case where communication using the frequency band higher than 6 GHz is assumed, when a failure occurs in some of communicating units and communication quality is degraded, it may be difficult to distinguish whether the degradation of the communication quality is caused by the failure or accompanies the blocking of a radio signal by an obstacle or the like.

Accordingly, the present disclosure proposes a technology that can realize diagnosis of operation of each communicating unit in a more suitable mode under conditions where plural communicating units are used for wireless communication.

Solution to Problem

According to the present disclosure, there is provided a communicating device including plural communicating units each configured to communicate with another communicating device via a wireless communication path; a casing configured to support the plural communicating units such that the plural communicating units respectively receive radio signals arriving from directions relatively different from each other; and a communication control section configured to control operation of each of the plural communicating units, the communication control section performing control such that priority is given to reception of a radio signal by a target communicating unit among the plural communicating units and controlling execution of processing related to diagnosis of the communicating unit in question, on the basis of a result of the reception.

In addition, according to the present disclosure, there is provided a control device including a communication control section configured to control operation of each of plural communicating units supported so as to receive radio signals arriving from directions relatively different from each other, the communication control section performing control such that priority is given to reception of a radio signal by a target communicating unit among the plural communicating units and controlling execution of processing related to diagnosis of the communicating unit in question, on the basis of a result of the reception.

In addition, according to the present disclosure, there is provided a control method including, by a computer, controlling operation of each of plural communicating units supported so as to receive radio signals arriving from directions relatively different from each other, control being performed such that priority is given to reception of a radio signal by a target communicating unit among the plural communicating units, execution of processing related to diagnosis of the communicating unit in question being controlled on the basis of a result of the reception.

BRIEF DESCRIPTION OF DRAWINGS

FIG. 4 is a diagram illustrating an example of a schematic configuration of antenna units applied to the terminal device according to the same embodiment.

FIG. 5 is a diagram illustrating another example of the schematic configuration of the antenna units applied to the terminal device according to the same embodiment.

FIG. 6 is an explanatory diagram of assistance in explaining an example of beam patterns related to transmission or reception of a radio signal which beam patterns are formed by a terminal device including plural communicating units.

DESCRIPTION OF EMBODIMENTS

Preferred embodiments of the present disclosure will hereinafter be described in detail with reference to the accompanying drawings. Incidentally, in the present specification and the drawings, constituent elements having substantially identical functional configurations are identified by the same reference signs, and repeated description thereof will thus be omitted.

Incidentally, description will be made in the following order.
1. General Configuration
   1.1. Example of System Configuration
   1.2. Example of Configuration of Terminal Device
2. Example of Configuration of Communicating Device Assuming Usage of Millimeter Waves
3. Technical Problems
4. Technical Features
   4.1. Outline
   4.2. Example of Control Related to Diagnosis of Communicating Units
   4.3. Modification
5. Hardware Configuration
6. Application Example
7. Conclusion

1. GENERAL CONFIGURATION

1.1. Example of System Configuration

Figure 1:
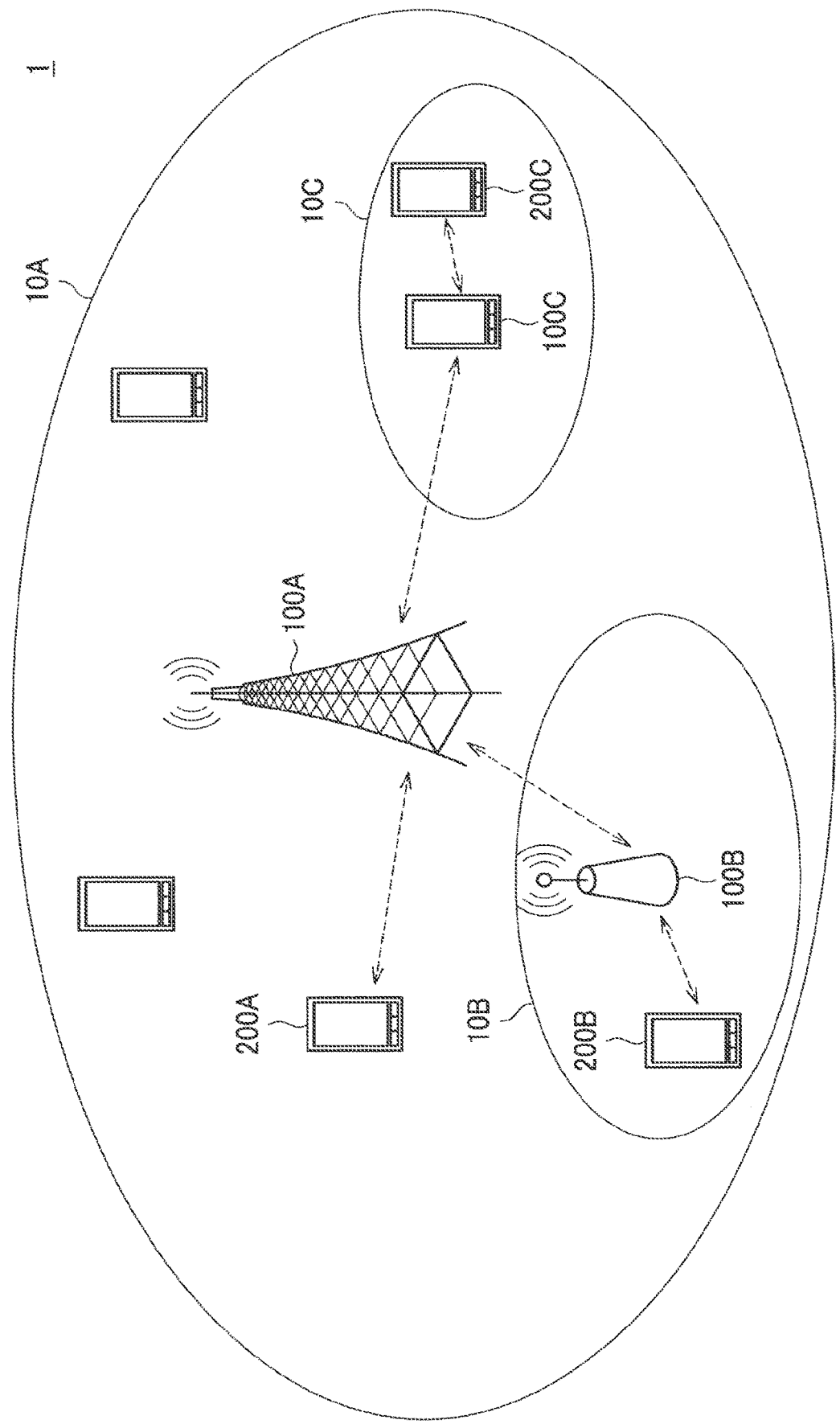
FIG. 1 is an explanatory diagram of assistance in explaining an example of a schematic configuration of a system according to one embodiment of the present disclosure.

First, an example of a schematic configuration of a system 1 according to one embodiment of the present disclosure will be described with reference to FIG. 1. FIG. 1 is an explanatory diagram of assistance in explaining an example of a schematic configuration of the system 1 according to one embodiment of the present disclosure. As illustrated in FIG. 1, the system 1 includes a wireless communication device 100 and a terminal device 200. Here, the terminal device 200 is also referred to as a user. The user may also be referred to as UE. A wireless communication device 100C is also referred to as a UE-Relay. The UE here may be UE defined in LTE or LTE-A, and the UE-Relay may be Prose UE to Network Relay as discussed in 3GPP or may more generally refer to communicating equipment.

(1) Wireless Communication Device 100

The wireless communication device 100 is a device that provides wireless communication service to a device under control. For example, a wireless communication device 100A is a base station of a cellular system (or a mobile communication system). The base station 100A performs wireless communication with a device (for example, a terminal device 200A) located within a cell 10A of the base station 100A. For example, the base station 100A transmits a downlink signal to the terminal device 200A, and receives an uplink signal from the terminal device 200A.

The base station 100A is logically connected to another base station by an X2 interface, for example, and is capable of transmitting and receiving control information or the like to and from the other base station. In addition, the base station 100A is logically connected to what is generally called a core network (not illustrated) by an SI interface, for example, and is capable of transmitting and receiving control information or the like to and from the core network. Incidentally, communication between these devices can be physically relayed by various devices.

Here, the wireless communication device 100A illustrated in FIG. 1 is a macrocell base station, and the cell 10A is a macrocell. On the other hand, wireless communication devices 100B and 100C are master devices that manage small cells 10B and 10C, respectively. As an example, the master device 100B is a fixedly installed small cell base station. The small cell base station 100B establishes a wireless backhaul link with the macrocell base station 100A, and establishes an access link with one or more terminal devices (for example, a terminal device 200B) within the small cell 10B. Incidentally, the wireless communication device 100B may be a relay node defined in 3GPP. The master device 100C is a dynamic AP (access point). The dynamic AP 100C is a mobile device that dynamically manages the small cell 10C. The dynamic AP 100C establishes a wireless backhaul link with the macrocell base station 100A, and establishes an access link with one or more terminal devices (for example, a terminal device 200C) within the small cell 10C. The dynamic AP 100C may, for example, be a terminal device including hardware or software that can operate as a base station or a wireless access point. The small cell 10C in this case is a local network (Localized Network/Virtual Cell) formed dynamically.

The cell 10A may, for example, be managed according to any wireless communication system such as NR, LTE, LTE-A (LTE-Advanced), LTE-ADVANCED PRO, GSM (registered trademark), UMTS, W-CDMA, CDMA200, WiMAX, WiMAX2, or IEEE 802.16.

Incidentally, small cells are of a concept that can include various kinds of cells (for example, a femtocell, a nanocell, a picocell, a microcell, and the like) that are arranged so as to overlap a macrocell or not to overlap a macrocell and are smaller than a macrocell. In a certain example, a small cell is managed by a dedicated base station. In another example, a small cell is managed by a terminal serving as a master device and temporarily operating as a small cell base station. What is generally called a relay node can also be regarded as one form of a small cell base station. A wireless communication device functioning as a master station of a relay node is also referred to as a donor base station. The donor base station may refer to a DeNB in LTE, or may more generally refer to a master station of a relay node.

(2) Terminal Device 200

The terminal device 200 can communicate in the cellular system (or the mobile communication system). The terminal device 200 performs wireless communication with a wireless communication device (for example, the base station 100A or the master device 100B or 100C) of the cellular system. For example, the terminal device 200A receives a downlink signal from the base station 100A, and transmits an uplink signal to the base station 100A.

In addition, the terminal device 200 is not limited to what is generally called UE alone, and, for example, what is generally called a low cost terminal (Low cost UE) such as an MTC terminal, an eMTC (Enhanced MTC) terminal, or an NB-IoT terminal may be applied as the terminal device 200.

(3) Supplement

A schematic configuration of the system 1 has been illustrated above. However, the present technology is not limited to the example illustrated in FIG. 1. For example, a configuration not including the master devices, an SCE (Small Cell Enhancement), a HetNet (Heterogeneous Network), an MTC network, or the like can be adopted as the configuration of the system 1. In addition, as another example of the configuration of the system 1, a master device may connect to a small cell, and construct a cell, under the control of the small cell.

An example of a schematic configuration of the system 1 according to one embodiment of the present disclosure has been described above with reference to FIG. 1.

1.2. Example of Configuration of Terminal Device

Figure 2:
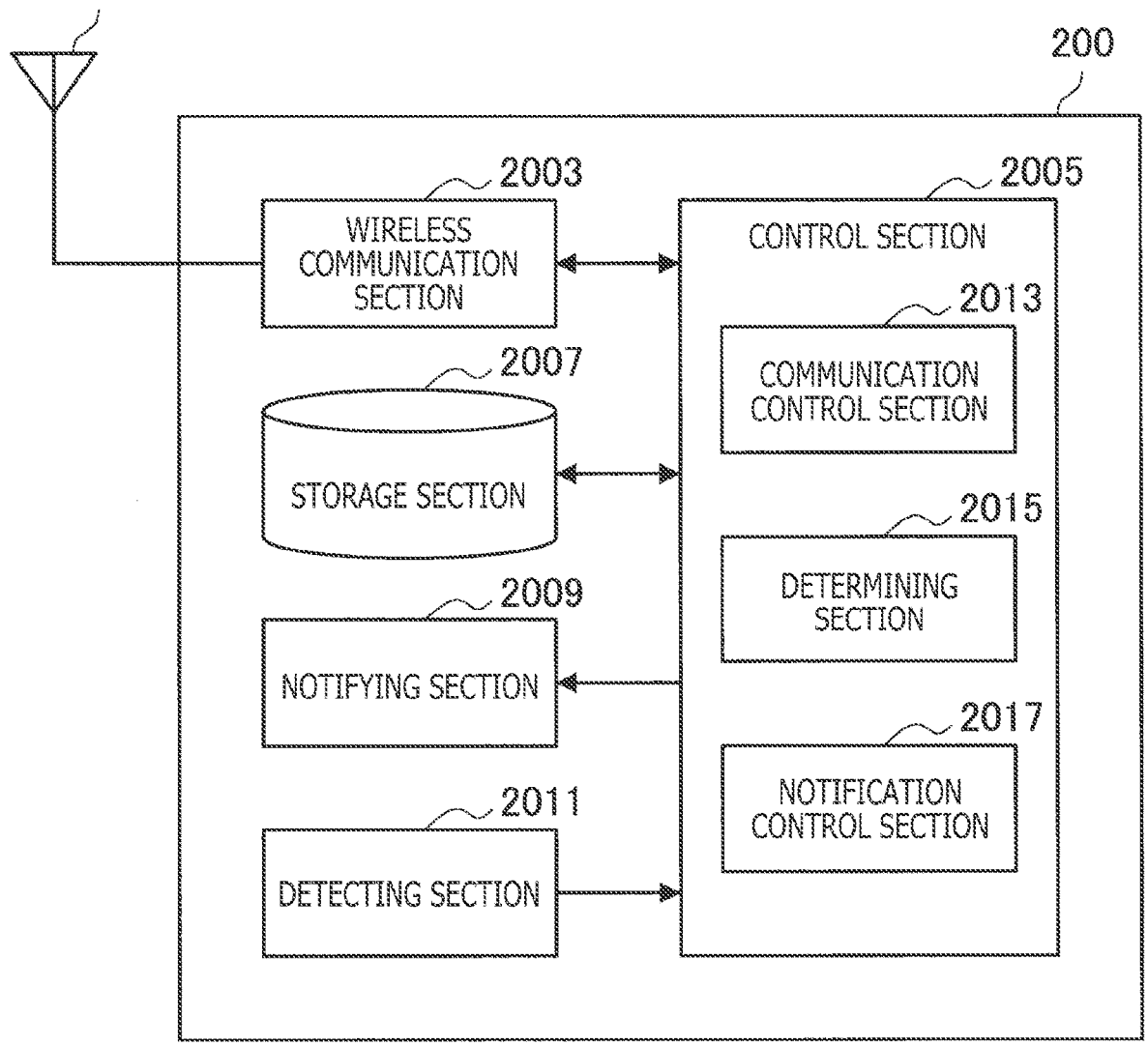
FIG. 2 is a block diagram illustrating an example of a configuration of a terminal device according to the same embodiment.

An example of a configuration of the terminal device 200 according to the embodiment of the present disclosure will next be described with reference to FIG. 2. FIG. 2 is a block diagram illustrating an example of a configuration of the terminal device 200 according to the embodiment of the present disclosure. As illustrated in FIG. 2, the terminal device 200 includes an antenna section 2001, a wireless communication section 2003, a storage section 2007, a notifying section 2009, a detecting section 2011, and a control section 2005.

(1) Antenna Section 2001

The antenna section 2001 radiates a signal output by the wireless communication section 2003, as a radio wave into a space. In addition, the antenna section 2001 converts a radio wave in the space into a signal, and outputs the signal to the wireless communication section 2003.

(2) Wireless Communication Section 2003

The wireless communication section 2003 transmits and receives signals. For example, the wireless communication section 2003 receives a downlink signal from a base station, and transmits an uplink signal to the base station.

(3) Storage Section 2007

The storage section 2007 temporarily or permanently stores a program and various kinds of data for the operation of the terminal device 200.

(4) Notifying Section 2009

The notifying section 2009 notifies the user of various kinds of information. The configuration of the notifying section 2009 may be changed as appropriate according to a method of giving notification of notification information, and plural kinds of devices may be applied as the notifying section 2009. As a specific example, the notifying section 2009 may be configured as a display unit such as what is generally called a display. In this case, the notifying section 2009 notifies the user of various kinds of information by displaying display information such as an image (for example, a moving image or a still image). In addition, as another example, the notifying section 2009 may be configured as a sound output unit such as what is generally called a speaker. In this case, the notifying section 2009 notifies the user of various kinds of information by outputting sound such as a voice. In addition, the notifying section 2009 may include a vibrating unit such as an actuator, simulate a tactile sense or a force sense by vibrating the vibrating unit, and notify the user of various kinds of information by presenting the tactile sense or the force sense. Of course, these are mere examples, and do not necessarily limit the kind and method of the notification information and the configuration of the notifying section 2009 for giving notification of the notification information.

(5) Detecting Section 2011

The detecting section 2011 detects various kinds of states of the terminal device 200. As a specific example, the detecting section 2011 may include various kinds of sensors such as an acceleration sensor and an angular velocity sensor, and detect a change in the posture of a casing of the terminal device 200, a change in the position of the terminal device 200, and the like.

(6) Control Section 2005

The control section 2005 provides various functions of the terminal device 200. The control section 2005 includes a communication control section 2013, a determining section 2015, and a notification control section 2017. Incidentally, the control section 2005 can further include constituent elements other than these constituent elements. That is, the control section 2005 can perform operations other than the operations of these constituent elements.

The communication control section 2013 controls communication with another device (for example, a base station 100) by controlling the operation of the wireless communication section 2003. As a specific example, the communication control section 2013 may generate a transmission signal by modulating, on the basis of a predetermined modulation system, data to be transmitted, and make the wireless communication section 2003 transmit the transmission signal to the base station 100. In addition, as another example, the communication control section 2013 may obtain, from the wireless communication section 2003, a result of reception of a signal (that is, a received signal) from the base station 100, and demodulate data transmitted from the base station 100 by subjecting the received signal to predetermined demodulation processing.

The determining section 2015 makes various kinds of determinations. For example, the determining section 2015 may make desired determinations according to results of detection of various kinds of states by the detecting section 2011. As a specific example, the determining section 2015 may determine whether or not a terminal device 200 is in a desired posture on the basis of a result of detection of a change in the posture of the terminal device 200 (posture of the casing) by the detecting section 2011.

The notification control section 2017 controls notification of information via the notifying section 2009. As a specific example, the notification control section 2017 may make the notifying section 2009 give notification of various kinds of notification information, according to a result of control of communication by the communication control section 2013. In addition, as another example, the notification control section 2017 may make the notifying section 2009 give notification of various kinds of notification information, according to results of determination of various kinds of states by the determining section 2015.

It is to be noted that the configuration illustrated in FIG. 2 is a mere example, and does not necessarily limit the functional configurations of the terminal device 200 according to the present embodiment. As a specific example, a part of each configuration of the terminal device 200 may be provided outside the terminal device 200. As a more specific example, a part corresponding to the wireless communication section 2003 may be externally attached as an external device to the terminal device 200. In addition, as another example, a configuration corresponding to the control section 2005 may be configured as an external device such as a chip, and functions thereof may be implemented by mounting the terminal device 200 with the external device. Thus, the wireless communication section 2003 and the control section 2005 may be provided in devices different from each other. In this case, the device including the control section 2005 corresponds to an example of a "control device." In addition, at least a part of each configuration of the terminal device 200 may be implemented by plural devices operating in cooperation with each other.

An example of a configuration of the terminal device 200 according to the embodiment of the present disclosure has been described above with reference to FIG. 2.

2. EXAMPLE OF CONFIGURATION OF COMMUNICATING DEVICE ASSUMING USAGE OF MILLIMETER WAVES

In a communication system based on a standard such as LTE/LTE-A, radio signals of frequencies called ultrahigh frequencies approximately in a range of 700 MHz to 3.5 GHZ are used for communication. On the other hand, under consideration is the usage of communication using radio signals of frequencies called millimeter waves such as 28 GHZ and 39 GHz (hereinafter also simply referred to as "millimeter waves") in a fifth-generation (5G) mobile communication system following LTE/LTE-A. Accordingly, in the following, description will be made of an outline of communication using millimeter waves, followed by description of an example of a configuration of a communicating device assuming the usage of millimeter waves.

Communication using ultrahigh frequencies as in LTE/LTE-A adopts a technology referred to as what is generally called MIMO (Multiple-Input and Multiple-Output). Thus, even under a fading environment, communication performance can be improved more by using reflected waves for signal transmission and reception in addition to direct waves.

On the other hand, while millimeter waves make it possible to increase an amount of information transmitted as compared with ultrahigh frequencies, millimeter waves tend to have high straightness and increase a propagation loss and a reflection loss. Thus, in an environment in which no obstacle is present on a path establishing direct connection between antennas that transmit and receive radio signals (what is generally called LOS: Line of Site), mainly direct waves contribute to communication characteristics with little effect of reflected waves. From such characteristics, in communication using millimeter waves, communication performance can be improved more when, for example, a communication terminal such as a smart phone receives a radio signal (that is, a millimeter wave) transmitted directly from a base station (that is, receives a direct wave).

Figure 3:
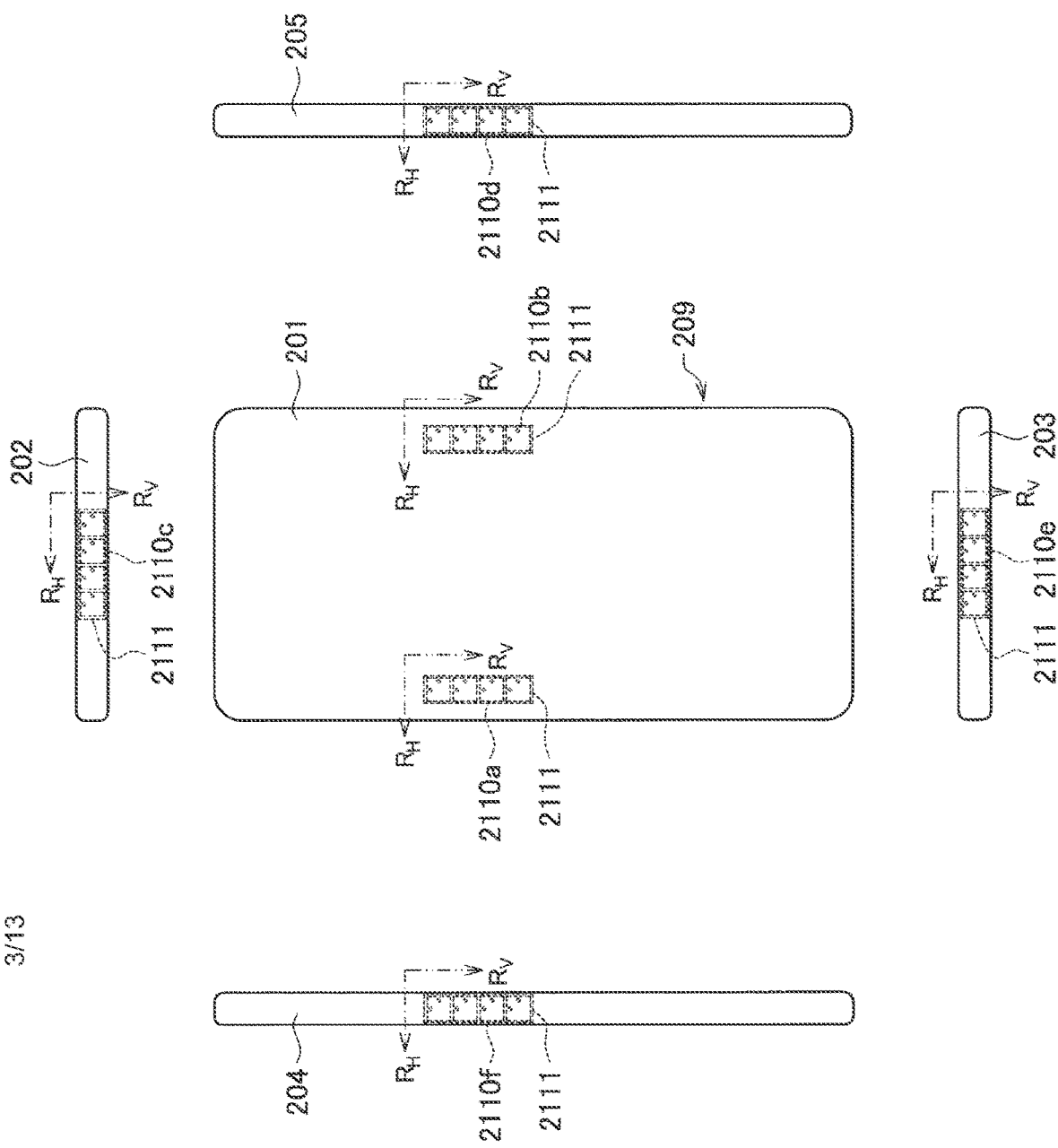
FIG. 3 is an explanatory diagram of assistance in explaining an example of a configuration of a communicating device assuming the usage of millimeter waves.

Next, an example of a configuration in a case where what is generally called an array antenna obtained by forming antenna elements into an array is applied to a communicating device such as the terminal device 200 described earlier will be described as an example of a configuration of a communicating device assuming the usage of millimeter waves. For example, FIG. 3 is an explanatory diagram of assistance in explaining an example of a configuration of a communicating device assuming the usage of millimeter waves. Incidentally, in the following description, the communicating device illustrated in FIG. 3 may be referred to as a "communicating device 211," for convenience.

The communicating device 211 has a plate-shaped casing 209 having a front surface and a back surface that form a substantially rectangular shape. Incidentally, in the present description, the surface on a side where a display unit such as a display is disposed is referred to as the front surface of the casing 209. That is, in FIG. 3, reference sign 201 denotes the back surface among external surfaces of the casing 209. In addition, reference signs 203 and 205 each correspond to one end surface located on the perimeter of the back surface 201 among the external surfaces of the casing 209, and more specifically denote end surfaces extending in a longitudinal direction of the back surface 201. In addition, reference signs 202 and 204 each correspond to one end surface located on the perimeter of the back surface 201 among the external surfaces of the casing 209, and more specifically denote end surfaces extending in a lateral direction of the back surface 201. Incidentally, though not illustrated in FIG. 3, the front surface located on an opposite side of the back surface 201 may be referred to as a "front surface 206," for convenience.

In addition, in FIG. 3, each of reference signs 2110*a* to 2110*f* indicates an antenna unit for transmitting and receiving radio signals (for example, millimeter waves) to and from a base station. Incidentally, in the following description, in cases where the antenna units 2110*a* to 2110*f* are not particularly distinguished from each other, the antenna units 2110*a* to 2110*f* may simply be referred to as an "antenna unit 2110." In addition, the antenna unit 2110 (that is, each of the antenna units 2110a to 2110f) can correspond to an example of a "communicating unit."

As illustrated in FIG. 3, for each of the back surface 201 and the end surfaces 202 to 205 of the communicating device 211, the antenna unit 2110 is retained (installed) within the casing 209 so as to be located in the vicinity of at least a part of the surface.

In addition, the antenna unit 2110 includes plural antenna elements 2111. More specifically, the antenna unit 2110 is configured as an array antenna by forming the plural antenna elements 2111 into an array. For example, antenna elements 2111a are retained so as to be located in the vicinity of an end portion on the end surface 204 side of the back surface 201, and the plural antenna elements 2111 are provided so as to be arranged along a direction in which the end portion extends (that is, the longitudinal direction of the end surface 204). In addition, antenna elements 2111d are retained so as to be located in the vicinity of a part of the end surface 205, and the plural antenna elements 2111 are provided so as to be arranged along the longitudinal direction of the end surface 205.

In addition, in the example illustrated in FIG. 3, what is generally called a patch antenna (planar antenna) is applied as the antenna elements 2111. Thus, in an antenna unit 2110 retained so as to be located in the vicinity of a certain surface, each antenna element 2111 is retained such that the normal direction of the planar element substantially coincides with the normal direction of the surface. As a more specific example, in a case where attention is directed to the antenna unit 2110a, the antenna elements 2111 provided to the antenna unit 2110a are retained such that the normal direction of the planar elements substantially coincides with the normal direction of the back surface 201. The same is true for the other antenna units 2110b to 2110f.

With the configuration as described above, by controlling the phase and power of a radio signal transmitted or received by each of the plural antenna elements 2111, each antenna unit 2110 can control the directivity of the radio signal (that is, perform beam forming).

It is to be noted that the configuration illustrated in FIG. 3 is a mere example, and does not necessarily limit the configuration of the terminal device according to one embodiment of the present disclosure. As a specific example, an antenna element other than a patch antenna may be applied as the antenna elements 2111. That is, the configuration of the antenna unit 2110 and the configuration of the antenna elements 2111 included in the antenna unit 2110 are not particularly limited as long as the directivity of the radio signal transmitted or received by each of the plural antenna elements 2111 can be controlled.

Here, referring to FIG. 4 and FIG. 5, description will be made of an example of configuration of communicating units applied to the terminal device according to one embodiment of the present disclosure. FIG. 4 and FIG. 5 are diagrams illustrating an example of schematic configuration of antenna units applied to the terminal device according to the present embodiment.

A configuration of antenna units illustrated in FIG. 4 will first be described. The antenna units illustrated in FIG. 4 represent an example of a case where plural antenna elements constituting an antenna array are connected to a digital baseband (Digital base band) circuit and an RF (Radio Frequency) circuit. The RF circuit transmits and receives radio signals via the antenna elements. Thus, the RF circuit can, for example, include a configuration for receiving a radio signal such as a down converter and an ADC, a configuration for transmitting a radio signal such as an up converter and a DAC, and the like. In addition, in the example illustrated in FIG. 4, each of the plural antenna elements is connected to the RF circuit via a phase shifter. On the basis of such a configuration, the directivity of radio signals can be controlled by controlling the phase of the radio signals transmitted and received via each antenna element. In addition, the digital baseband circuit performs modulation processing for transmitting transmission target data as a radio signal, demodulation processing of data from a result of reception of a radio signal, and the like. In the example illustrated in FIG. 4, the series of antenna elements constituting an antenna array connected to the digital baseband circuit and the RF circuit can correspond to an example of a "communicating unit" according to the present disclosure. In addition, under conditions where plural antenna units including a digital baseband circuit, an RF circuit, and a series of antenna elements are provided, each antenna unit may correspond to an example of a "communicating unit" according to the present disclosure.

A configuration of antenna units illustrated in FIG. 5 will next be described. In an antenna unit illustrated in FIG. 5, a digital baseband circuit and an RF circuit are provided for each antenna element to form one unit. On the basis of such a configuration, grouping is performed so as to include one or more antenna elements, and the directivity of radio signals is controlled by controlling the phase of the radio signals transmitted and received via each antenna element for each of the groups. That is, in the example illustrated in FIG. 5, each of the series of antenna elements of each group (in other words, one or more antenna elements included in the group) can correspond to an example of a "communicating unit" according to the present disclosure. In addition, a configuration including the series of antenna elements of each group and digital baseband circuits and RF circuits connected to the antenna elements (that is, a series of grouped antenna units) may correspond to an example of a "communicating unit" according to the present disclosure.

3. TECHNICAL PROBLEMS

Technical problems of a communicating device according to one embodiment of the present disclosure will next be described.

As described earlier, in 5G, standardization is under way to realize high-capacity communication of 10 to 20 Gbps by broad-band transmission using an even higher frequency band than that of 4G (LTE). The conventional cellular system provides a service area in a planar manner in order to deal with the mobility of terminal devices. However, when a frequency band even higher than the frequency band used in 4G is used, it may be difficult to meet a conventional coverage. In particular, because of a narrow coverage as well as very strong straightness in a frequency band higher than 6 GHZ, a transmitting and receiving device may be out of sight due to blocking by a building, a person, a vehicle, or the like, and sufficient radio field intensity may not be obtained. Therefore, a very high throughput is expected to be realized within the coverage of a frequency band higher than 6 GHz while a coverage is secured by combination with a band equal to or lower than the 6 GHz band.

In the case of using a frequency band higher than 6 GHZ, not only is there a large propagation loss, but also there is a possibility of communication quality being significantly degraded by the presence of a moving blocking object such as a person or a vehicle, so that it may be difficult to realize stable communication. With such conditions assumed, reception quality at a time of transmission and reception of data may be ensured by providing plural communicating units (for example, antenna modules) to a terminal device as illustrated in FIG. 3, for example, and selectively changing a communicating unit to be used and a beam pattern to be applied.

For example, FIG. 6 is an explanatory diagram of assistance in explaining an example of beam patterns related to transmission or reception of a radio signal which beam patterns are formed by a terminal device including plural communicating units. In the example illustrated in FIG. 6, the terminal device 200 includes plural communicating units 220a to 220d. Each of the communicating units 220a to 220d is supported by a casing of the terminal device 200 such that beams are formed in directions relatively different from each other. Specifically, in the example illustrated in FIG. 6, beams are formed in the respective directions of a top and a bottom, a left and a right, and a front and a back of the casing of the terminal device 200.

As a more specific example, as illustrated in a left diagram of FIG. 6, in order to receive a radio signal arriving from an upper surface direction (+y direction) of the terminal device 200, the communicating unit 220a forms a beam #0 (Rx beam #0) in that direction. Similarly, the communicating units 220b, 220c, and 220d respectively form beams #1 to #3 (Rx beams #1, #2, and #3) for receiving radio signals respectively arriving from a left surface direction (−x direction), a lower surface direction (−y direction), and a right surface direction (+x direction) of the terminal device 200. In addition, as illustrated in a right diagram of FIG. 6, any one of the communicating units 220a to 220d forms beams (Rx beams #4 and #5) for receiving a radio signal from each of a front surface direction (+z direction) and a back surface direction (−z direction) of the terminal device 200.

On the other hand, under such conditions that a communicating unit to be used for communication is selectively changed among the plural communicating units, even when it becomes difficult for some of the communicating units to operate due to a failure or the like, the communication may be enabled by using another communicating unit. For example, in a case where it becomes difficult for the communicating unit 220b to operate due to a failure in the example illustrated in FIG. 6, it becomes difficult to form the beam #1, and as a result, it becomes difficult to receive a radio signal arriving from the left surface direction (−y direction) of the terminal device 200.

A radio signal in a frequency band higher than 6 GHZ, in particular, can be attenuated also when passing through the casing itself of the terminal device. Thus, in consideration of a decrease in reception power which decrease accompanies the attenuation, a communicating unit (antenna module) using such a radio signal for communication may be disposed in the vicinity of an edge of the casing as in the example illustrated in FIG. 3, for example. On the other hand, when the communicating unit is disposed in the vicinity of the edge of the casing, there is, for example, a fear of a possibility of the communicating unit becoming faulty by receiving an impact accompanying the falling of the terminal device or the like. That is, in a case of a configuration in which a terminal device includes plural communicating units as illustrated in FIG. 3, possible to expect is a situation in which it becomes difficult for some of the plural communicating units to function due to a failure or the like. On the other hand, in a case where communication using a frequency band higher than 6 GHz is assumed, when a failure occurs in some of the communicating units and communication quality is degraded, it may be difficult to distinguish whether the degradation of the communication quality is caused by the failure (that is, the degradation of the communication quality is attendant on a malfunction) or accompanies the blocking of the radio signal by an obstacle or the like (that is, a temporary degradation of the communication quality according to surrounding conditions).

In view of the conditions as described above, the present disclosure proposes a technology that can realize diagnosis of operation of each communicating unit in a more suitable mode under conditions where plural communicating units are used for wireless communication. Specifically, the present disclosure proposes an example of a technology that, even in a case where a failure occurs in a part of communicating units, can detect the failure in the communicating unit in question in a more suitable mode.

4. TECHNICAL FEATURES

Technical features of the communicating device according to one embodiment of the present disclosure will next be described.

<4.1. Outline>

A flow of diagnosis that, in a case where it has become difficult for some of the plural communicating units to function due to a failure or the like, makes it possible to detect that the communicating unit in question is faulty will first be described as an outline of the technology according to the present embodiment. For example, FIG. 7 is an explanatory diagram of assistance in explaining an outline of an example of a method of diagnosing a communicating unit in the communicating device according to one embodiment of the present disclosure.

Figure 7:
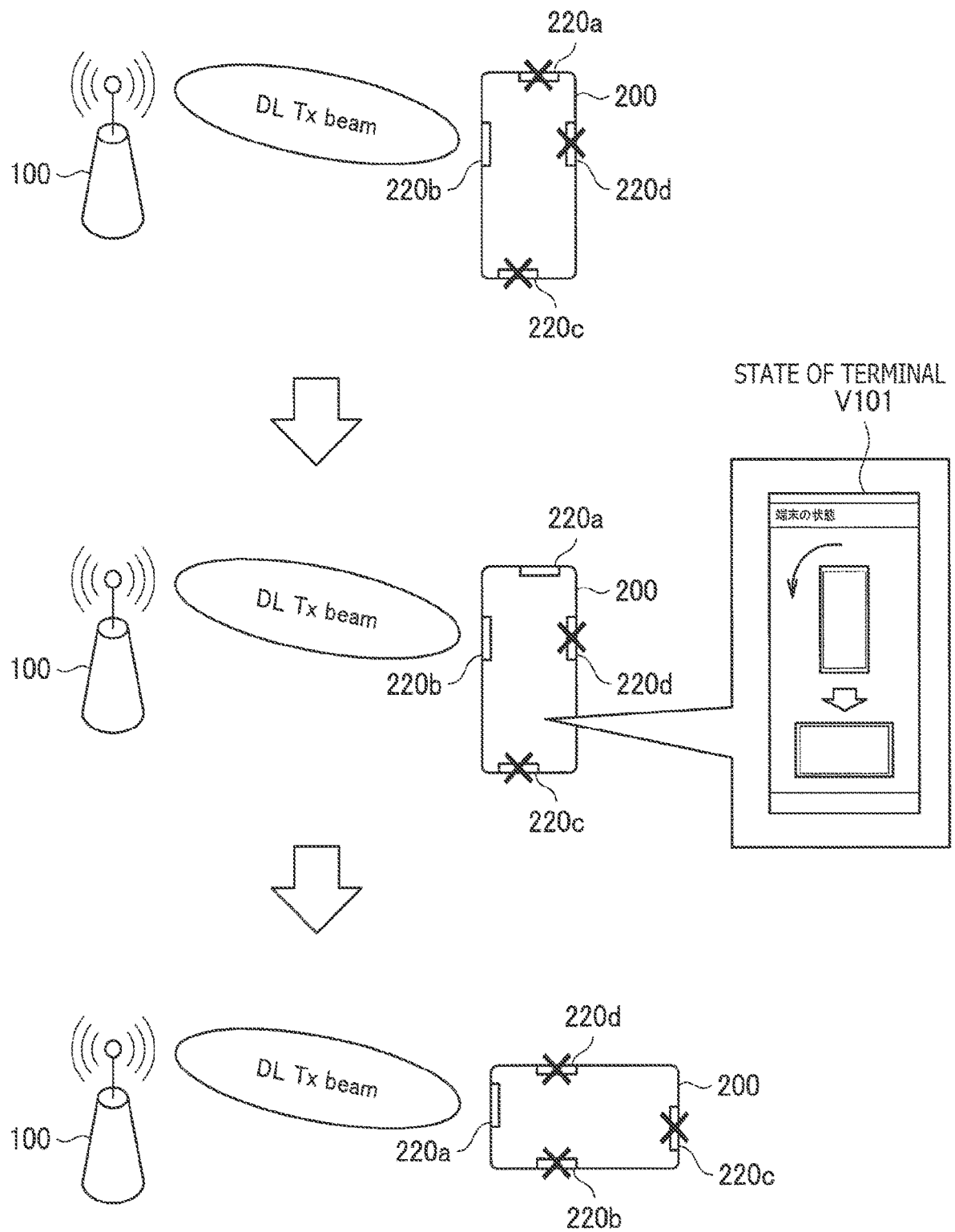
FIG. 7 is an explanatory diagram of assistance in explaining an outline of an example of a method of diagnosing communicating units in a communicating device according to the same embodiment.

In the example illustrated in FIG. 7, each of the communicating units 220a to 220d possessed by the terminal device 200 individually receives a radio signal (downlink signal) transmitted from the base station 100, and whether each communicating unit 220 is normally operating is individually diagnosed according to a reception result. Specifically, the terminal device 200 performs control so as to give higher priority to reception of the downlink signal from the base station 100 by a target communicating unit 220 among the communicating units 220a to 220d, and performs various kinds of processing related to the diagnosis of the communicating unit 220 in question according to a result of the reception.

Incidentally, the example illustrated in FIG. 7 assumes a case where a radio signal in a millimeter waveband is used as the downlink signal from the base station 100. Specifically, the base station 100 forms a beam by controlling the directivity of the radio signal on the basis of a beam forming technology, and spatially multiplexes communication with the terminal device 200 by sequentially changing beam patterns. That is, the terminal device 200 receives the downlink signal (radio signal) transmitted from the base station 100 in any one of the beam patterns changed sequentially, by each communicating unit 220, and thereby performs various kinds of processing related to the diagnosis of the communicating unit 220. Incidentally, while the terminal device 200 forms beams for receiving a radio signal in the six directions, that is, the upward and downward directions, the left and right directions, and the front and rear directions, in the example illustrated in FIG. 6, description in the following will be made with the direction being limited to four directions, that is, the upward and downward directions and the left and right directions, in order to simplify the description.

Specifically, first, as illustrated in a diagram in an upper part of FIG. 7, in a state in which some of the plural communicating units 220 can receive a downlink signal (DL Tx beam) transmitted from the base station 100, control is performed so as to give higher priority to the reception by the communicating unit 220 in question. For example, in the diagram in the upper part of FIG. 7, the communicating unit 220*b* is selected as a target for diagnosis. Thus, in a state in which the communicating unit 220*b* receives the downlink signal from the base station 100, operation related to the reception of the radio signal by the other communicating units 220 (that is, the communicating units 220*a*, 220*c*, and 220*d*) is suppressed (by extension, disabled). Incidentally, in this case, the communicating unit 220*b* selected as a diagnosis target corresponds to an example of a "first communicating unit," and the communicating units 220 other than the communicating unit 220*b* (that is, the communicating units 220 in which operation related to the reception of the radio signal is suppressed) correspond to an example of a "second communicating unit."

It is to be noted that as long as the state illustrated in the diagram in the upper part of FIG. 7 is attained, a method and control contents for attaining the state are not particularly limited. As a specific example, after the communicating unit 220*b* is determined as a diagnosis target, the operation of the other communicating units 220*b* may be suppressed after the user is guided to perform such an operation as to enable the communicating unit 220*b* in question to receive the downlink signal from the base station 100. Methods for guiding the user include, for example, a method of prompting the user to perform an operation of changing the posture of the terminal device 200 (for example, an operation of rotating the casing) such that the communicating unit 220*b* faces a direction of arrival of the downlink signal transmitted from the base station 100. At this time, the user may be notified of the communicating unit 220*b* as a diagnosis target by a predetermined notifying method. In addition, the order of performing each of the processing of prompting the user to perform the above-described operation and the processing of suppressing the operation of the communicating units 220 other than the communicating unit 220*b* as a diagnosis target is not particularly limited.

In addition, as another example, at a time of a start of processing related to diagnosis, the communicating unit 220 in a state of being able to receive the downlink signal from the base station 100 (for example, the communicating unit 220*b*) may be determined as a diagnosis target, and the operation of the communicating units 220 other than the communicating unit 220 may be suppressed. In this case, the user may be notified of the communicating unit 220*b* as a diagnosis target by a predetermined notifying method. In addition, the order of performing the processing of notifying the user of the communicating unit 220*b* as a diagnosis target and the processing of suppressing the operation of the communicating units 220 other than the communicating unit 220*b* as a diagnosis target is not particularly limited.

Then, on the basis of a result of reception of the downlink signal from the base station 100 by the communicating unit 220*b*, the terminal device 200 performs various kinds of processing related to diagnosis of the operation of the communicating unit 220*b* in question. As a specific example, the terminal device 200 may measure the reception strength of the downlink signal by using a reference signal such as an SSB (Synchronization signal/PBCH block) or an CSI-RS (Channel-state information reference signal), and determine whether or not the communicating unit 220*b* is operating normally, according to a result of the measurement. In this case, the terminal device 200 may, for example, determine that the communicating unit 220*b* is operating normally in a case where the reception strength is equal to or higher than a threshold value, and may determine that an abnormality has occurred in the communicating unit 220*b* in question in a case where the reception strength is lower than the threshold value. In addition, in this case, the above-described measurement may be performed using the SSB or CSI-RS specified by, for example, a TCI state (Transmission Configuration Indicator state), SRS-Spatial RlationInfo, or the like. In addition, a measurement period may, for example, be determined according to the transmission cycle of an ssb-periodicityServingCell (transmission interval of an SSB set), a periodic/semi-persistent CSI-RS, or the like. In addition, the measurement period may be determined according to sub-carrier intervals and a frequency band being used. As a specific example, control may be performed such that the wider the sub-carrier intervals, the shorter the measurement period per antenna element. In addition, control may be performed such that the higher the frequency band being used, the shorter the measurement period per antenna element. As a result of the above, it is possible to determine whether or not the communicating unit 220*b* as a diagnosis target is operating normally.

When the processing related to the diagnosis of the communicating unit 220*b* is ended, the terminal device 200 determines whether or not there is another communicating unit 220 that can be a diagnosis target (for example, a communicating unit 220 whose diagnosis has not been performed). At this time, in a case where there is no communicating unit 220 that can be a diagnosis target, the terminal device 200 ends the execution of the processing related to diagnosis of the series of communicating units 220. On the other hand, in a case where there are communicating units 220 that can be a diagnosis target, the terminal device 200 determines a communicating unit 220 as a next diagnosis target from among the communicating units 220 that can be a diagnosis target. For example, in a diagram in a middle part of FIG. 7, the terminal device 200 determines the communicating unit 220*a* as a next diagnosis target from among the communicating units 220*a*, 220*c*, and 220*d* whose diagnosis has not been performed.

When the terminal device 200 determines the communicating unit 220*a* as a next diagnosis target, the terminal device 200 cancels the suppression of the operation of the communicating unit 220*a* in question (in other words, enables the communicating unit 220*a*), and guides the user to set the communicating unit 220*a* in question in a state of being able to receive the downlink signal from the base station 100. As an example of a method for the guidance, the terminal device 200 may notify the user via a notifying unit (for example, an output unit such as a display) of notification information V101 prompting for an operation of changing the posture of the terminal device 200 such that the communicating unit 220*a* faces the direction of arrival of the downlink signal from the base station 100. As a specific example, in the example illustrated in FIG. 7, display information indicating a direction of rotation of the casing of the terminal device 200 or display information indicating the posture of the casing of the terminal device 200 after the rotation is presented as the notification information V101 via the display. In addition, at this time, the user may be notified of the communicating unit 220*a* as a next diagnosis target by a predetermined notifying method. Of course, the notification information V101 illustrated in FIG. 7 is a mere example, and as long as the user can be guided to perform such an operation that the casing of the terminal device 200 is set in a desired posture, the method of guiding the user is not particularly limited. In addition, the order of performing the processing of guiding the user to set the communicating unit 220*a* in a state of being able to receive the downlink signal from the base station 100 and the processing of cancelling the suppression of the operation of the communicating unit 220*a* in question is not particularly limited.

Next, suppose that, as illustrated in a diagram in a lower part of FIG. 7, with the operation of the user receiving the guidance by the notification information V101, that is, with a change in the posture of the terminal device 200, the communicating unit 220*a* as a next diagnosis target is set in a state of being able to receive the downlink signal from the base station 100. At this time, the terminal device 200 suppresses the operation of the communicating unit 220*b* previously set as a diagnosis target (by extension, disables the operation of the communicating unit 220*b*). Then, on the basis of a result of reception of the downlink signal from the base station 100 by the communicating unit 220*a*, the terminal device 200 performs various kinds of processing related to the diagnosis of the operation of the communicating unit 220*a* in question.

As described above, by performing various kinds of processing related to the diagnosis of the communicating unit 220 while sequentially changing the communicating unit 220 as a diagnosis target, the terminal device 200 individually determines whether or not each of the plural communicating units 220 is operating normally. At this time, because the common radio signal from the base station 100 is used for the diagnosis of the plural communicating units 220 as illustrated in FIG. 7, in a case where a failure or the like has occurred in some of the communicating units 220, a result of diagnosis of only some of the communicating units 220 is abnormal. That is, even in a case where it has become difficult for some of the plural communicating units 220 to function due to a failure or the like, the control as described above enables detection of the some of the communicating units 220.

A flow of diagnosis that, in a case where it has become difficult for some of the plural communicating units to function due to a failure or the like, makes it possible to detect the communicating unit in question has been described above as an outline of the technology according to the present embodiment with reference to FIG. 7.

<4.2. Example of Control Related to Diagnosis of Communicating Units>

Next, an example of control related to the diagnosis of the communicating units 220 by the terminal device 200 in the system according to one embodiment of the present disclosure will be described in more detail with attention directed particularly to control in which the terminal device 200 gives priority to reception of the radio signal by a communicating unit 220 as a diagnosis target.

First, as a premise, description will be made of an outline of operation of the base station 100 and the terminal device 200 in a case where a beam is formed by controlling the directivity of a radio signal on the basis of the beam forming technology.

Figure 8:
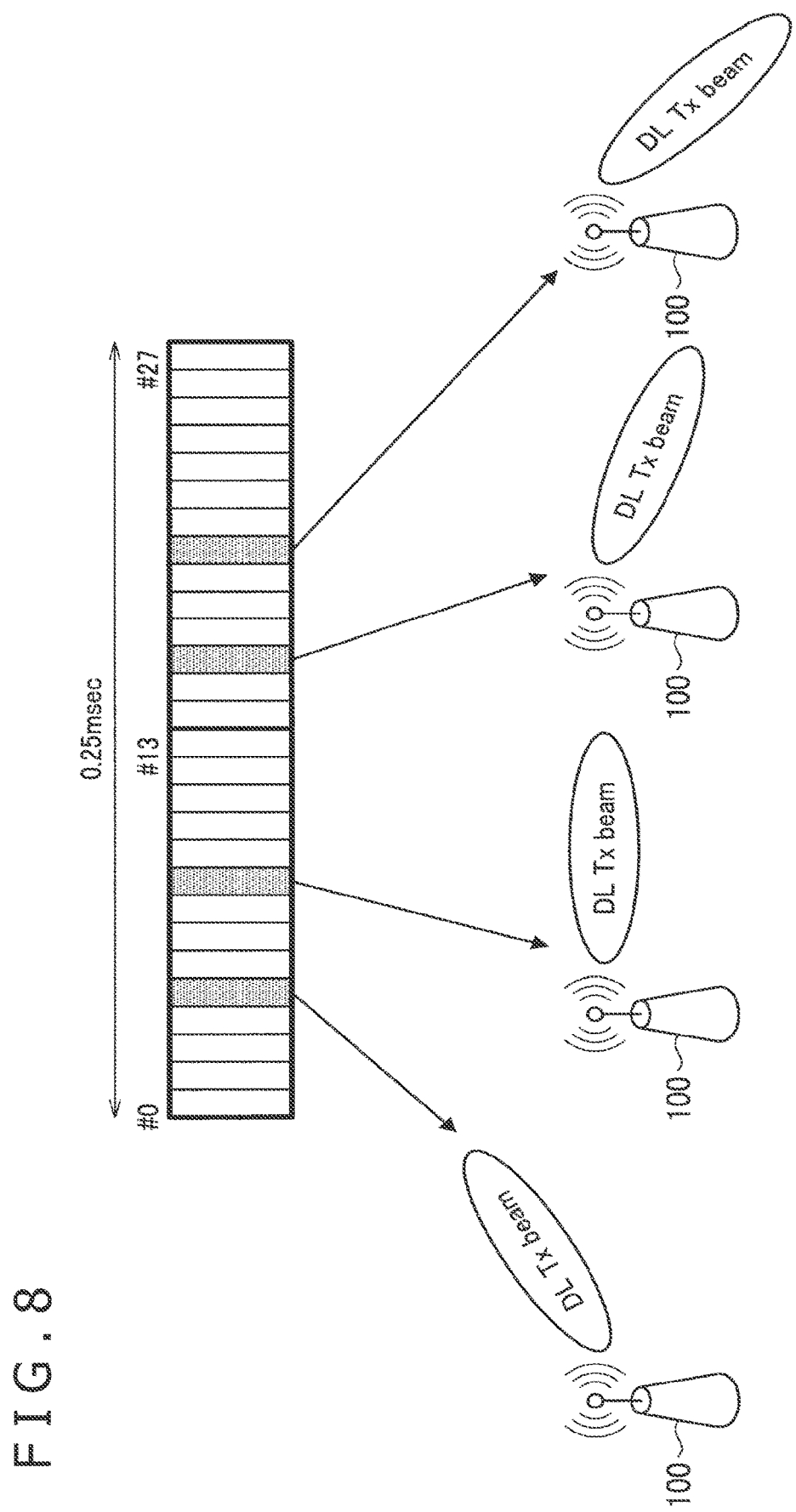
FIG. 8 is an explanatory diagram of assistance in explaining an outline of an example of operation of a base station in a case where a beam is formed by controlling the directivity of a radio signal on the basis of a beam forming technology.

For example, FIG. 8 is an explanatory diagram of assistance in explaining an outline of an example of operation of the base station 100 in a case where a beam is formed by controlling the directivity of a radio signal on the basis of the beam forming technology. As a specific example, for SS/PBCH blocks (SSB) in a case where 120 kHz subcarrier spacing is applied, one slot (14 OFDM symbols) is 0.125 ms. In addition, an SSB set is transmitted in 5 ms or less. For example, in the example illustrated in FIG. 8, a transmission time interval (TTI: Transmission TimeInterval) is set to be 0.25 ms (that is, a period for two slots), and an SSB set is transmitted within the TTI. On the basis of such a premise, as illustrated in FIG. 8, the base station 100 (gNB) performs SSB transmission while selectively and sequentially switching among plural beam patterns (for example, plural beam patterns having directions different from each other) within the SSB set.

Figure 9:
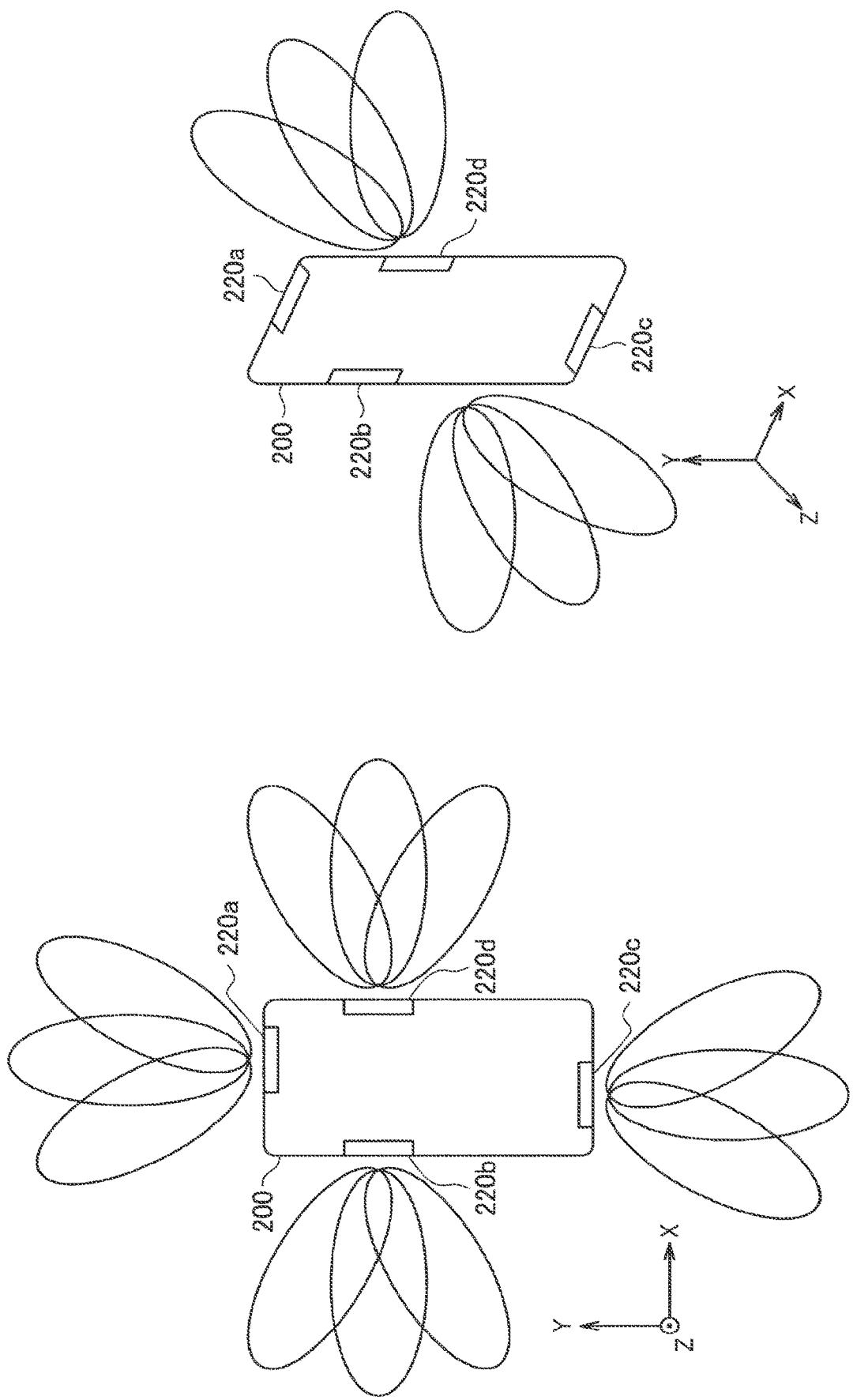
FIG. 9 is an explanatory diagram of assistance in explaining an outline of an example of operation of the terminal device in a case where beams are formed by controlling the directivity of a radio signal on the basis of the beam forming technology.

In addition, FIG. 9 is an explanatory diagram of assistance in explaining an outline of an example of operation of the terminal device 200 in a case where beams are formed by controlling the directivity of a radio signal on the basis of the beam forming technology. Specifically, at least some of the plural communicating units 220 possessed by the terminal device 200 determine a beam pattern to be used for reception of a radio signal (for example, the downlink signal) from among candidates for plural beam patterns that can be formed. For simpler description, the example illustrated in FIG. 9 represents a case where each of the communicating units 220*a* to 220*d* is configured to be able to form three beam patterns in a corresponding direction. That is, in the example illustrated in FIG. 9, three beam patterns can be formed for each of the six directions, that is, the upward and downward directions, the left and right directions, and the forward and rearward directions, of the terminal device 200. Of course, each of the communicating units 220 may be configured to be able to form more than three beam patterns. On the basis of such a configuration, the terminal device 200, for example, determines a combination of a communicating unit 220 having a highest radio signal reception power and a beam pattern formed by the communicating unit 220 in question as a combination of the communicating unit 220 and the beam pattern to be used for the reception of the radio signal. Incidentally, while the example illustrated in FIG. 9 represents a case where the terminal device 200 forms beam patterns (for example, beams for the reception of the radio signal) in the six directions, that is, the upward and downward directions, the left and right directions, and the forward and rearward directions, various descriptions in the following will be made with the directions being limited to four directions, that is, the upward and downward directions and the left and right directions, in order to simplify the description, as described earlier.

Figure 10:
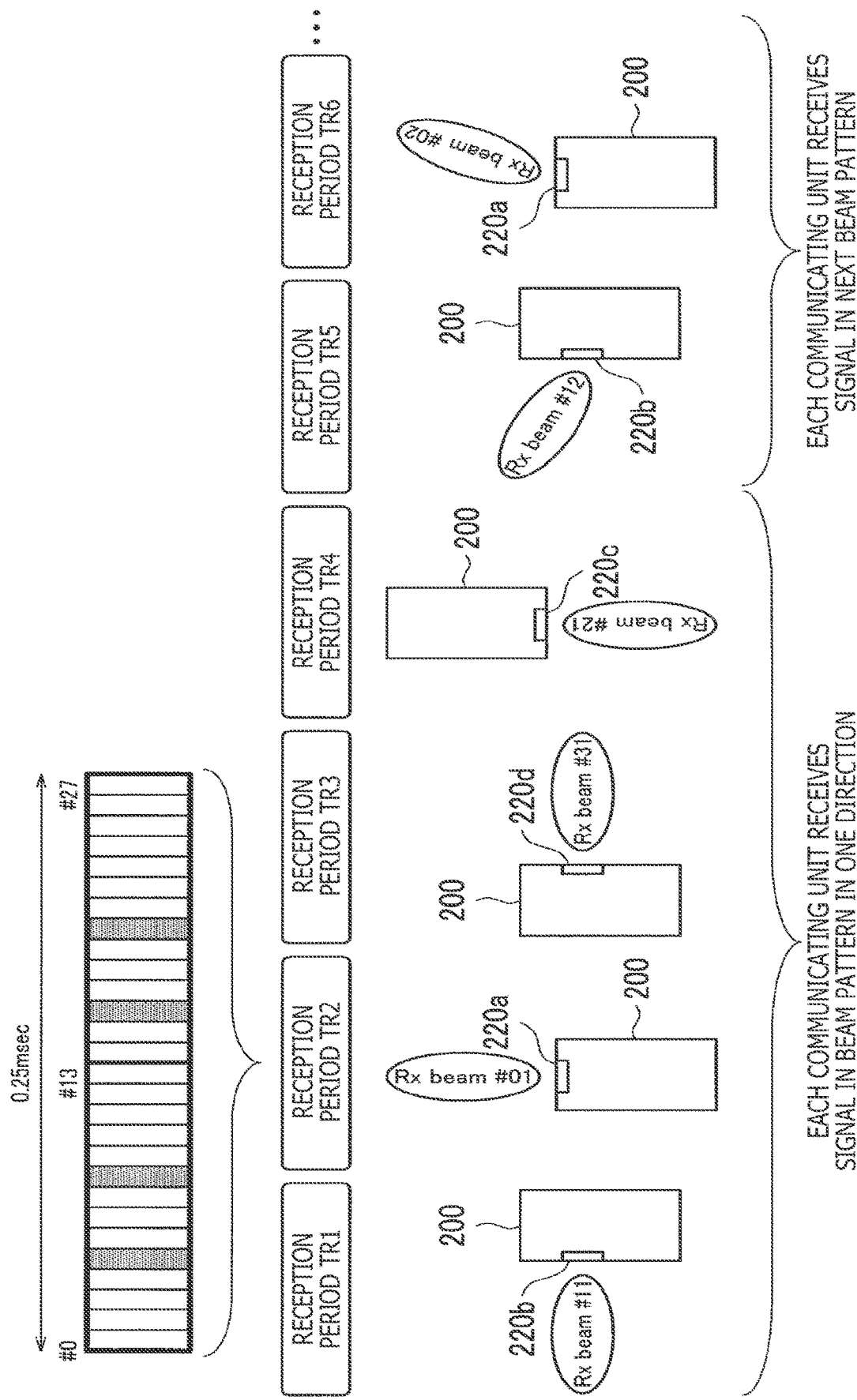
FIG. 10 is an explanatory diagram of assistance in explaining an outline of an example of a flow of operation related to diagnosis of communicating units by a communicating device according to a comparative example.

Next, for easier understanding of features of the system according to one embodiment of the present disclosure, an example of a flow of operation related to diagnosis of each communicating unit 220 by the terminal device 200 illustrated in FIG. 9 will be described as a comparative example. For example, FIG. 10 is an explanatory diagram of assistance in explaining an outline of an example of a flow of operation related to diagnosis of communicating units by a communicating device according to a comparative example (terminal device 200). In FIG. 10, each of reception periods TR1 to TR6 schematically represents a unit period related to the reception of the downlink signal from the base station 100, and, for example, corresponds to the period in which the SSB set described with reference to FIG. 8 is transmitted (for example, a period for two slots).

As illustrated in FIG. 10, while the terminal device 200 according to the comparative example sequentially changes a combination of a communicating unit 220 and a beam pattern used for the reception of the radio signal in each reception period, the terminal device 200 according to the comparative example performs the processing related to diagnosis of the communicating unit 220 in question.

Specifically, in the example illustrated in FIG. 10, the terminal device 200 sequentially changes the communicating unit 220 as a diagnosis target in order of the communicating units 220b, 220a, 220d, and 220c in the reception periods TR1, TR2, TR3, and TR4. In addition, at this time, the terminal device 200 uses, in each communicating unit 220, any one of plural beam patterns that can be formed by the communicating unit 220, and attempts to receive the downlink signal from the base station 100. The terminal device 200 thereby performs the processing related to diagnosis of the communicating unit 220 in question. Specifically, in the reception periods TR1, TR2, TR3, and TR4, beam patterns represented by Rx beams #11, #01, #31, and #21 are each selected as a beam pattern to be used for the reception of the radio signal.

In addition, the diagnosis of each communicating unit 220 is performed again in the reception period TR5 and subsequent reception periods. At this time, beam patterns different from the beam patterns used for the reception of the radio signal in the previous diagnosis (that is, the diagnosis performed in the reception periods TR1 to TR4) (that is, beam patterns not yet used for diagnosis) may be selected. As a specific example, in the reception period TR5, the communicating unit 220b is selected as a diagnosis target again. At this time, a beam pattern different from the Rx beam #11 used in the previous diagnosis (that is, the diagnosis in the reception period TR1), that is, a beam pattern represented by a Rx beam #12, is selected as the beam pattern to be used for the reception of the radio signal. Similarly, in the reception period TR6, the communicating unit 220a is selected as a diagnosis target again. At this time, a beam pattern different from the Rx beam #01 used in the previous diagnosis (that is, the diagnosis in the reception period TR2), that is, a beam pattern represented by a Rx beam #02, is selected as the beam pattern to be used for the reception of the radio signal.

Thus, the terminal device 200 according to the comparative example sequentially performs the diagnosis of each communicating unit 220 without setting priorities between the communicating units 220a to 220d.

Figure 11:
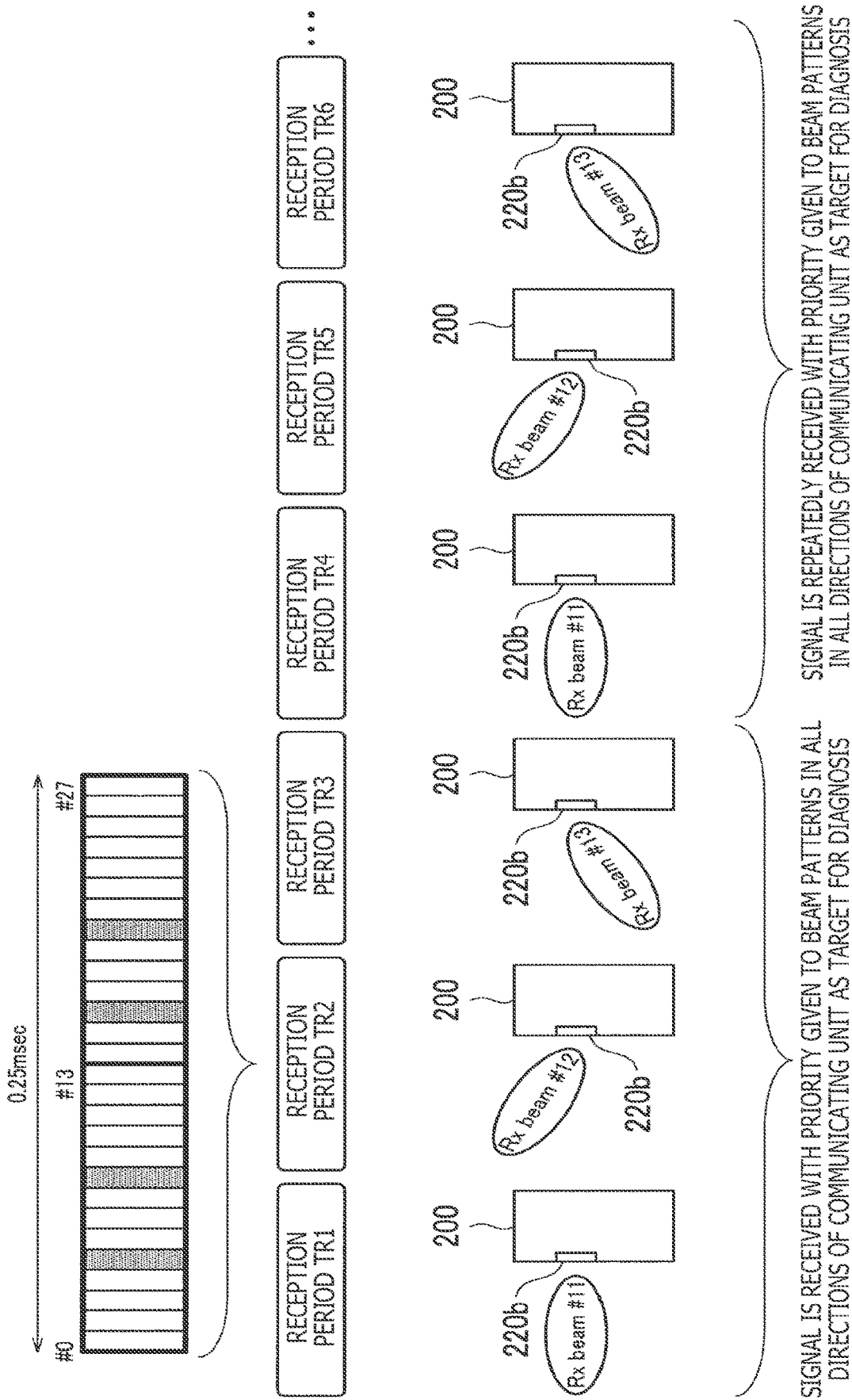
FIG. 11 is an explanatory diagram of assistance in explaining an outline of an example of a flow operation related to diagnosis of a communicating unit by the communicating device according to the same embodiment.

Next, referring to FIG. 11, description will be made of an example of a flow of operation related to diagnosis of each communicating unit 220 by the terminal device 200 according to one embodiment of the present disclosure. FIG. 11 is an explanatory diagram of assistance in explaining an outline of an example of a flow of operation related to diagnosis of communicating units by the communicating device (terminal device 200) according to the present embodiment. In FIG. 11, each of the reception periods TR1 to TR6 schematically represents a unit period related to the reception of the downlink signal from the base station 100, as in the example illustrated in FIG. 10, and, for example, corresponds to a period in which the SSB set described with reference to FIG. 8 is transmitted.

The example illustrated in FIG. 11 is different from the example described with reference to FIG. 10 in that control is performed such that the reception of the radio signal by a communicating unit 220 selected as a target among the plural communicating units 220 possessed by the terminal device 200 is performed more preferentially. Specifically, in the example illustrated in FIG. 11, the communicating unit 220b is selected as a target among the communicating units 220a to 220d. Therefore, control is performed such that the reception of the radio signal by the communicating unit 220b is given higher priority than the reception of the radio signal by the other communicating units 220.

Specifically, in the example illustrated in FIG. 11, in the reception periods TR1 to TR3, the communicating unit 220b is set as a target, and the radio signal is received using each of the beam patterns that can be formed by the communicating unit 220b in question. That is, in the reception periods TR1, TR2, and TR3, beam patterns represented by Rx beams #11, #12, and #13 are sequentially selected. As is understood from a comparison of the example illustrated in FIG. 11 with the example illustrated in FIG. 10, the terminal device 200 according to the present embodiment performs control such that a frequency at which the communicating unit 220b as a target receives the radio signal is higher than those of the other communicating units 220 (that is, the communicating units 220a, 220c, and 220d). Such control further increases a frequency at which measurement related to the communicating unit 220b as a target is to be performed, and can thus further improve accuracy of diagnosis of the communicating unit 220b in question.

In addition, in the example illustrated in FIG. 11, the communicating unit 220b is selected as a target also in the reception period TR4 and subsequent reception periods. This can further improve the accuracy of diagnosis of the communicating unit 220b in question.

On the other hand, measurement related to the other communicating units 220 may be performed as long as the frequency at which measurement related to the communicating unit 220 as a target (for example, the communicating unit 220b) is performed is higher than those of the other communicating units 220. As a specific example, measurement related to the communicating units 220a, 220c, and 220d may be performed in the reception periods TR4, TR5, and TR6. In this case, with regard to each of the communicating units 220a, 220c, and 220d, measurement may be performed only for some (for example, one beam pattern) of the beam patterns that can be formed. In other words, the communicating unit 220 as a target may be controlled so as to form a larger number of beams to be used for the measurement, as compared to the other communicating units 220.

In addition, as in the example described with reference to FIG. 7, while measurement is performed for some of the communicating units 220 that are selected as a target, the reception of the radio signal by the other communicating units 220 may be suppressed (by extension, disabled).

It is to be noted that, in the example illustrated in FIG. 11, a case where the respective lengths of the reception periods TR1 to TR6 are substantially equal to each other has been described, but such description does not necessarily limit the operation related to the diagnosis of the communicating unit 220 by the terminal device 200 according to the present embodiment. That is, a case where the lengths of the reception periods are not necessarily fixed can also be included in the scope of the technology according to the present disclosure when control is performed such that the frequency at which measurement related to the communicating unit 220 as a target is performed is higher than frequencies at which measurement related to the other communicating units 220 is performed.

In the above, with reference to FIGS. 8 to 11, an example of control related to diagnosis of the communicating units 220 by the terminal device 200 in the system according to one embodiment of the present disclosure has been described in more detail with attention directed particularly to control in which the terminal device 200 gives priority to the reception of the radio signal by the communicating unit 220 as a diagnosis target.

<4.3. Modifications>

Next, modifications of the technology according to one embodiment of the present disclosure will be described.

(First Modification: Example of Application to Moving Body)

First, description will be made of, as a first modification, an example of control related to diagnosis of the communicating units 220 in a case where the terminal device 200 is formed as what is generally called a moving body, which itself is configured to be movable, such as a drone, an automatic traveling vehicle, or an autonomous mobile robot.

In a case where the terminal device 200 is formed as a moving body, the position and posture of the terminal device 200 can be changed by such operation such as movement of the terminal device 200 itself. Thus, the terminal device 200 according to the present modification may, for example, control the position and posture of the terminal device 200 itself so as to be set in a state of being able to diagnose a communicating unit 220 as a target.

As a specific example, the terminal device 200 may move to the inside of a millimeter wave coverage when diagnosing the communicating units 220. Incidentally, information related to the millimeter wave coverage can, for example, be recognized on the basis of a result of previously performed communication using millimeter waves. In addition, the terminal device 200 may obtain the information related to the millimeter wave coverage from another device (for example, a base station, an access point, or the like) by using other communication different from the communication using millimeter waves (for example, communication using a frequency band lower than millimeter waves, such as LTE, NR Sub6, or WiFi (registered trademark)).

As a more specific example, in a case where the terminal device 200 is formed as a drone, reception sensitivity of each communicating unit may be changed according to an altitude at which the drone (terminal device 200) flies. In such a case, the terminal device 200 may adjust the flying altitude such that a communicating unit as a target becomes able to receive the radio signal (for example, a millimeter wave).

It is to be noted that a trigger for the terminal device 200 to diagnose each of the communicating units 220 is not particularly limited, and can be set as appropriate according to an expected use case. As a specific example, the terminal device 200 may perform the processing related to diagnosis of at least some of the communicating units 220 in a case where the terminal device 200 receives an instruction for the diagnosis of the communicating unit 220 from the user. In this case, receiving the instruction from the user, the terminal device 200 may move to the inside of the millimeter wave coverage, and start diagnosing the communicating unit 220 as a target. In addition, at this time, the terminal device 200 may control the posture of the terminal device 200 itself such that the communicating unit 220 as a target becomes able to receive the downlink signal from the base station 100.

In addition, the terminal device 200 may autonomously perform the processing related to diagnosis of at least some of the communicating units 220 according to the state of the terminal device 200 itself. As a specific example, the terminal device 200 may monitor the usage state of each of the plural communicating units 220, and perform the processing related to diagnosis of at least some of the communicating units 220, according to a result of the monitoring. More specifically, the terminal device 200 may monitor an unused period of each of the plural communicating units 220. Then, in a case where the unused period of at least some of the communicating units 220 exceeds a threshold value, the terminal device 200 may perform the processing related to diagnosis of the communicating unit 220. Incidentally, in this case, the terminal device 200 may move to the inside of the millimeter wave coverage, and start diagnosing the communicating unit 220 as a target. In addition, at this time, the terminal device 200 may control the posture of the terminal device 200 itself such that the communicating unit 220 as a target becomes able to receive the downlink signal from the base station 100.

In addition, in a case where the terminal device 200 detects a state in which diagnosis of at least some of the communicating units 220 is possible, the terminal device 200 may perform the processing related to diagnosis of the communicating unit 220. As a specific example, in a case where the terminal device 200 has moved to the inside of the millimeter wave coverage, the terminal device 200 may perform the processing related to diagnosis targeted at the communicating unit 220 that can perform communication using millimeter waves with the base station 100. In this case, the terminal device 200 may autonomously perform the processing related to the above-described diagnosis. In addition, as another example, the terminal device 200 may perform the processing related to the above-described diagnosis in a case where the diagnosis of the communicating units 220 is scheduled on the basis of an advance instruction by the user.

In the above, description has been made of, as the first modification, an example of control related to diagnosis of the communicating units 220 in a case where the terminal device 200 is formed as what is generally called a moving body, which itself is configured to be movable, such as a drone, an automatic traveling vehicle, or an autonomous mobile robot.

(Second Modification: Example of Application to Communicating Device Having Movable Portion)

Next, description will be made of, as a second modification, an example of control related to diagnosis of the communicating units 220 in a case where the terminal device 200 has a movable portion in a part of the casing.

Figure 12:
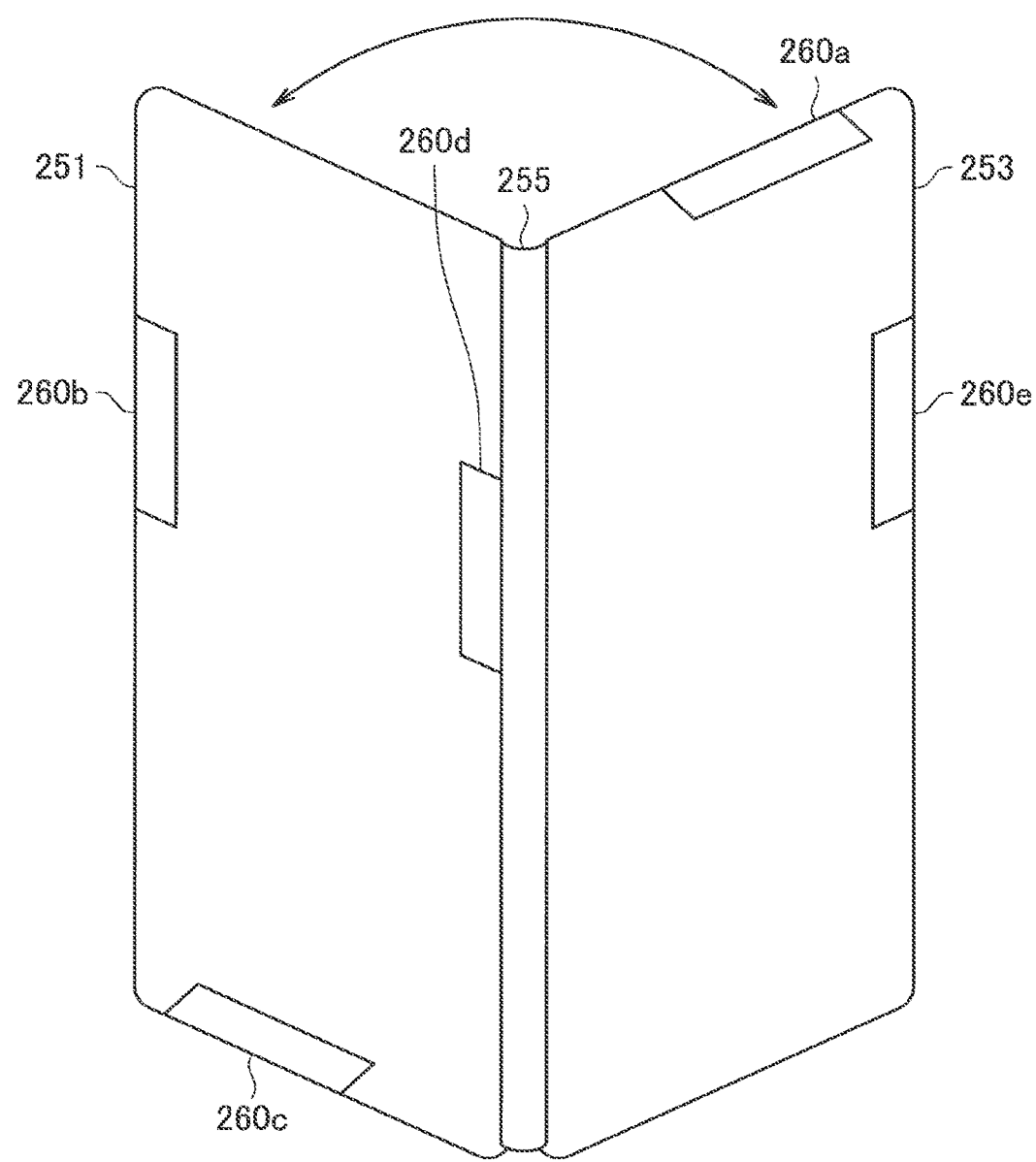
FIG. 12 is an explanatory diagram of assistance in explaining an example of a schematic configuration of a communicating device according to a second modification.

For example, FIG. 12 is an explanatory diagram of assistance in explaining an example of a schematic configuration of a communicating device according to the second modification. FIG. 12 illustrates an outline of an example of a configuration of a terminal device having a movable portion in a part of the casing. Incidentally, in the following description, the terminal device illustrated in FIG. 12 may be referred to as a "terminal device 250" to be distinguished from the terminal devices according to the foregoing embodiment and the other modification. On the other hand, in a case where the terminal device according to the present modification is not particularly distinguished from the terminal devices according to the foregoing embodiment and the other modification, the terminal device according to the present modification may simply be referred to as the "terminal device 200."

The terminal device 250 illustrated in FIG. 12 is configured as what is generally called a "foldable smart phone." Specifically, the terminal device 250 includes casings 251 and 253, a movable portion 255, and communicating units 260a to 260e.

Each of the casings 251 and 253 is formed in a plate shape having a front surface and a back surface that form a substantially rectangular shape. The casings 251 and 253 have one end portion and another end portion connected to each other via the movable portion 255 such that, with respect to one casing, the other casing can rotate. The movable portion 255 can be formed as such a member as what is generally called a hinge or the like that rotatably supports, with respect to the one, the other. With such a configuration, the terminal device 250 is configured to be openable and closable by rotating, with respect to the one of the casings 251 and 253, the other of the casings 251 and 253.

Each of the communicating units 260a to 260e corresponds to a communicating unit 220 in the terminal device 200 illustrated in FIG. 7 (that is, the communicating units 220a to 220d or the like). In the example illustrated in FIG. 12, each of the communicating units 260b to 260d is supported by the casing 251 so as to form beams in directions relatively different from each other with the casing 251 as a reference point. In addition, each of the communicating units 260a and 260e is supported by the casing 253 so as to form beams in directions relatively different from each other with the casing 253 as a reference point.

With the configuration as described above, in the terminal device 250 illustrated in FIG. 12, the position and posture of at least some of the communicating units 260 among the communicating units 260a to 260e can be changed according to the state of the movable portion 255 (that is, an opened/closed state). As a specific example, in a case where the posture of the casing 251 is fixed and the casing 253 is thereafter rotated with respect to the casing 251, the position and posture of the communicating unit 260e supported by the casing 253 change according to a state of the rotation (that is, the state of the movable portion 255). That is, the direction of the beam formed by the communicating unit 260e changes according to the state of the movable portion 255. Thus, even under conditions where the posture of the whole of the terminal device 250 is fixed, the position and posture of the communicating unit 260e can change according to the state of the movable portion 255 (that is, the opened/closed state). Therefore, a need for considering a change in the position and posture of the communicating unit 260e can arise when the communicating unit 260e is diagnosed.

In view of conditions as described above, the terminal device 250 according to the second modification controls the execution of the processing related to diagnosis of at least some of the communicating units 260, according to the state of the movable portion 255.

As a specific example, the terminal device 250 may perform the processing related to diagnosis of each communicating unit 260 in a case where the movable portion 255 is in a predetermined state (for example, in a state in which the terminal device 250 is opened). In this case, in a case where the movable portion 255 is not in the predetermined state, the terminal device 250 may guide the user so as to attain the state by notifying the user of predetermined notification information via a notifying section. As a specific example, in a case where the terminal device 250 is in a closed state, the terminal device 250 may guide the user to perform an operation of changing the terminal device 250 to an opened state, and may start the processing related to diagnosis of the communicating units 260, according to a result of detection of the change to the opened state.

It is to be noted that a method of detecting the state of the movable portion 255 is not particularly limited. As a specific example, the opened/closed state of the terminal device 250 (in other words, the state of the movable portion 255) can be detected by using various kinds of sensors such as a magnetic sensor, an optical sensor, and a contact sensor. In addition, as another example, the state of the movable portion 255 may be detected by using an encoder or the like.

In addition, as another example, the terminal device 250 may recognize the position and posture of each communicating unit 260 according to the state of the movable portion 255, and perform the processing related to diagnosis of each communicating unit 260 according to a result of the recognition. Specifically, it is possible to recognize, with respect to one of the casings 251 and 253, the relative posture of the other of the casings 251 and 253, according to the state of the movable portion 255. In addition, changes in the position and posture of the whole of the terminal device 250 can be detected by using a result of detection of an acceleration sensor, an angular velocity sensor, or the like. Then, by combining these pieces of information, it is possible to recognize the position and posture of each communicating unit 260, and in turn, recognize the direction of a beam formed by each communicating unit 260. That is, the terminal device 250 may guide the user such that the communicating unit 260 as a target becomes able to receive the downlink signal from the base station 100, on the basis of a result of the recognition, and perform the processing related to diagnosis of the communicating unit 260 in question in a case where the communicating unit 260 in question becomes able to receive the downlink signal (for example, in a case where the communicating unit 260 in question is set in a predetermined posture) according to the guidance.

It is to be noted that the configuration illustrated in FIG. 12 is a mere example, and does not necessarily limit the configuration of the terminal device 250 according to the present modification. That is, the technology according to the present modification can be applied in cases where the movable portion is included and the position and posture of at least some of the communicating units 260 (in other words, a beam pattern formed by the communicating unit 260 in question) can change according to the state of the movable portion. In cases where the position and posture of each communicating unit 260 do not change irrespective of the state of the movable portion, on the other hand, the diagnosis of each communicating unit 260 can be performed on the basis of control similar to that of the foregoing embodiment.

In the above, referring to FIG. 12, description has been made of, as the second modification, an example of control related to diagnosis of the communicating units 220 in a case where the terminal device 200 has a movable portion in a part of the casing.

(Third Modification: Diagnosis Method Using Reflected Wave of Radio Signal from Terminal Device)

Next, description will be made of, as a third modification, an example of a case where the terminal device itself transmits a radio signal and uses a reflected wave of the radio signal for diagnosis of the communicating units.

In the foregoing embodiment, the terminal device 200 performs the processing related to diagnosis of each communicating unit 220 on the basis of a result of reception of the downlink signal transmitted from the base station 100. On the other hand, the terminal device 200 according to the present modification transmits a radio signal from at least some of the communicating units 220, receives a reflected wave of the radio signal which reflected wave results from reflection by an object in a real space or the like, by a communicating unit 220 as a target, and performs the processing related to diagnosis of the communicating unit 220 in question, on the basis of a result of the reception. Such a configuration enables the processing related to diagnosis of each communicating unit 220 to be performed even under conditions where it is difficult to receive the downlink signal using a millimeter wave from the base station 100.

It is to be noted that a reflector that reflects the radio signal transmitted from the terminal device 200 is not particularly limited as long as the reflector can reflect the radio signal, but is preferably an object that readily reflects a radio wave, in particular, such as a metal. As a specific example, a hand of the user or the like may be used as the reflector. In addition, as another example, a wall surface of a building or the like may be used as the reflector.

In addition, relation between the communicating unit 220 that transmits the radio signal and the communicating unit 220 that receives the radio signal is not particularly limited either. That is, the communicating unit 220 as a diagnosis target may be configured to transmit the radio signal and receive the radio signal. In addition, as another example, a communicating unit 220 different from the diagnosis target may be configured to transmit the radio signal, and the communicating unit 220 as the diagnosis target may be configured to receive the radio signal.

In addition, when the terminal device 200 starts diagnosing the communicating unit 220, the terminal device 200 may prompt the user to install the reflector by giving notification of notification information according to the position and posture of the communicating unit 220 as a diagnosis target, or may indicate an installation position of the reflector to the user. As a specific example, as in the example described with reference to FIG. 7, notification of the notification information may be given according to a result of selection of the communicating unit 220 as a diagnosis target, and the user may thereby be guided to change the posture of the terminal device 200 and guided to install the above-described reflector. Of course, also in this case, there is no particular limitation on the order of performing the respective pieces of processing of notifying the user of the communicating unit 220 as a diagnosis target, suppressing operation related to the reception of the radio signal by the other communicating units 220, providing guidance for a change in the posture of the terminal device 200, and providing guidance for the installation of the reflector. In addition, in this case, the contents of the notification information may be changed as appropriate according to the object used as the reflector. As a specific example, the contents of the notification information may be changed according to which of a setting for using a hand of the user as the reflector and a setting for using a wall surface of a building or the like as the reflector is applied as a setting related to the diagnosis of the communicating unit 220.

In the above, description has been made of, as the third modification, an example of a case where the terminal device itself transmits a radio signal and uses a reflected wave of the radio signal for the diagnosis of the communicating units.

(Fourth Modification: Example of Method of Determining Communicating Unit as Diagnosis Target)

Next, description will be made of, as a fourth modification, an example of a method of determining the communicating unit 220 as a diagnosis target in a case where the terminal device 200 itself determines the communicating unit 220 as the diagnosis target from among the plural communicating units 220.

For example, the terminal device 200 may determine the communicating unit 220 as a diagnosis target, according to respective communication histories of the plural communicating units 220. As a specific example, a communicating unit 220 having a new usage history is highly likely to be operating normally because the communicating unit 220 has a short period elapsed from a timing at which a previous communication is performed and is less likely to have suffered any failure during the period. On the other hand, the older the usage history, the longer the period elapsed from the timing at which the previous communication is performed, and the higher the likelihood of occurrence of a failure during the period. In view of such conditions, the terminal device 200 may, for example, preferentially select a communicating unit 220 having an older usage history as a diagnosis target.

In addition, as another example, the terminal device 200 may determine the communicating unit 220 as a diagnosis target, according to a frequency of occurrence of a predetermined error related to wireless communication in each of the plural communicating units 220, a frequency of occurrence of processing accompanying the error, or the like. For example, a communicating unit 220 in which Beam failure recovery occurs frequently is more likely to have suffered a failure than the other communicating units 220. In view of such conditions, the terminal device 200 may preferentially select a communicating unit 220 with a higher frequency of occurrence of Beam failure recovery, as a diagnosis target.

Of course, the above description is a mere example, and does not necessarily limit the method of determination of the communicating unit 220 as a diagnosis target by the terminal device 200 according to the present modification. That is, the method is not particularly limited as long as the terminal device 200 can identify a communicating unit 220 more likely to have suffered a failure from among the plural communicating units 220.

In the above, description has been made of, as the fourth modification, an example of a method of determining a communicating unit 220 as a diagnosis target in a case where the terminal device 200 itself determines the communicating unit 220 as the diagnosis target from among the plural communicating units 220.

5. HARDWARE CONFIGURATION

Figure 13:
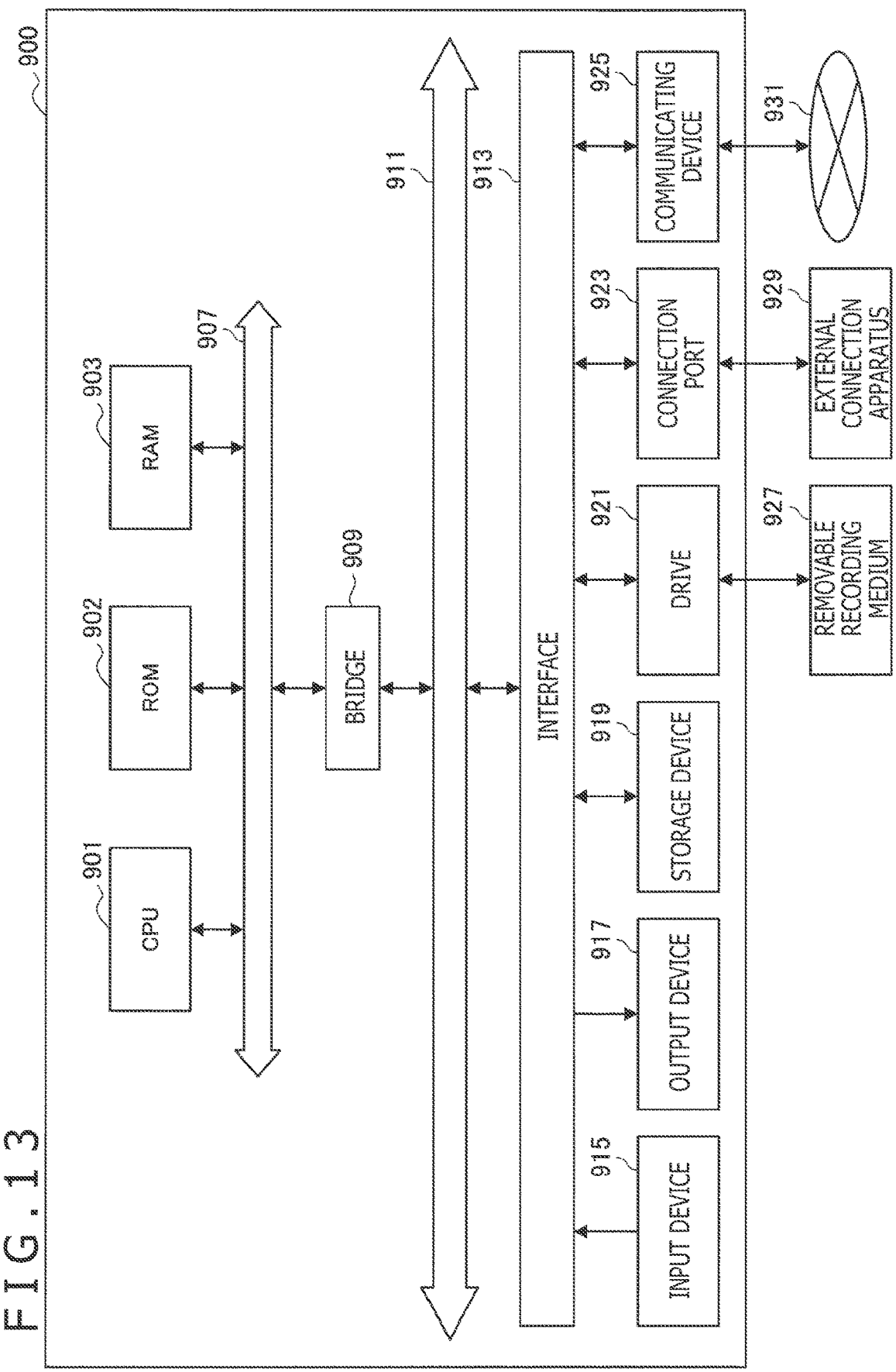
FIG. 13 is a functional block diagram illustrating an example of a hardware configuration of an information processing apparatus constituting the system according to the same embodiment.

Next, referring to FIG. 13, description will be made of an example of a hardware configuration of an information processing apparatus (for example, the terminal device 200 illustrated in FIG. 2) constituting the system according to the present embodiment. FIG. 13 is a functional block diagram illustrating an example of a hardware configuration of an information processing apparatus constituting the system according to one embodiment of the present disclosure.

The information processing apparatus 900 constituting an imaging system according to the present embodiment includes mainly a CPU 901, a ROM 903, and a RAM 905. In addition, the information processing apparatus 900 further includes a host bus 907, a bridge 909, an external bus 911, an interface 913, an input device 915, an output device 917, a storage device 919, a drive 921, a connection port 923, and a communicating device 925.

The CPU 901 functions as an arithmetic processing device and a control device, and controls the whole or a part of operation within the information processing apparatus 900 according to various kinds of programs recorded in the ROM 903, the RAM 905, the storage device 919, or a removable recording medium 927. The ROM 903 stores a program used by the CPU 901, operation parameters, and the like. The RAM 905 primarily stores the program used by the CPU 901, a parameter changing as appropriate in the execution of the program, and the like. These are interconnected by the host bus 907 including an internal bus such as a CPU bus. Incidentally, each configuration of the control section 2005 described above with reference to FIG. 2 (that is, the communication control section 2013, the determining section 2015, and the notification control section 2017) can be implemented by the CPU 901, for example.

The host bus 907 is connected to the external bus 911 such as a PCI (Peripheral Component Interconnect/Interface) bus via the bridge 909. In addition, the external bus 911 is connected with the input device 915, the output device 917, the storage device 919, the drive 921, the connection port 923, and the communicating device 925 via the interface 913.

The input device 915 is, for example, operating means operated by the user, such as a mouse, a keyboard, a touch panel, a button, a switch, a lever, and a pedal. In addition, the input device 915 may, for example, be remote control means (what is generally called remote control) using infrared rays or other radio waves, or may be an external connection apparatus 929 such as a mobile telephone or a PDA that supports operation of the information processing apparatus 900. Further, the input device 915 includes, for example, an input control circuit or the like that generates an input signal on the basis of information input by the user with use of the above-described operating means, and outputs the input signal to the CPU 901. A user of the information processing apparatus 900 can input various kinds of data to the information processing apparatus 900 or give an instruction for processing operation by operating the input device 915.

The output device 917 includes a device capable of visually or auditorily notifying the user of obtained information. Such devices include a display device such as a CRT display device, a liquid crystal display device, a plasma display device, an EL display device, and a lamp, an audio output device such as a speaker or headphones, and a printer device. The output device 917, for example, outputs results obtained by various kinds of processing performed by the information processing apparatus 900. Specifically, the display device displays, in text or an image, the results obtained by the various kinds of processing performed by the information processing apparatus 900. On the other hand, the audio output device converts an audio signal including reproduced audio data, acoustic data, or the like into an analog signal, and outputs the analog signal. Incidentally, the notifying section 2009 described above with reference to FIG. 2 can be implemented by the output device 917, for example.

The storage device 919 is a device for data storage which device is configured as an example of a storage unit of the information processing apparatus 900. The storage device 919 includes, for example, a magnetic storage unit device such as an HDD (Hard Disk Drive), a semiconductor storage device, an optical storage device, a magneto-optical storage device, or the like. The storage device 919 stores programs executed by the CPU 901, various kinds of data, and the like. Incidentally, the storage section 2007 described above with reference to FIG. 2 can be implemented by the storage device 919, for example.

The drive 921 is a reader-writer for a recording medium. The drive 921 is included in or externally attached to the information processing apparatus 900. The drive 921 reads information recorded on the removable recording medium 927 such as a magnetic disk, an optical disk, a magneto-optical disk, or a semiconductor memory loaded in the drive 921, and outputs the information to the RAM 905. The drive 921 can also write a record to the removable recording medium 927 such as a magnetic disk, an optical disk, a magneto-optical disk, or a semiconductor memory loaded in the drive 921. The removable recording medium 927 is, for example, DVD media, HD-DVD media, Blu-ray (registered trademark) media, or the like. In addition, the removable recording medium 927 may be a compact flash (registered trademark) (CF: CompactFlash), a flash memory, an SD memory card (Secure Digital memory card), or the like. In addition, the removable recording medium 927 may be, for example, an IC card (Integrated Circuit card) including a noncontact IC chip, an electronic apparatus, or the like.

The connection port 923 is a port for direct connection to the information processing apparatus 900. As an example of the connection port 923, there is a USB (Universal Serial Bus) port, an IEEE1394 port, an SCSI (Small Computer System Interface) port, or the like. As another example of the connection port 923, there is an RS-232C port, an optical audio terminal, an HDMI (registered trademark) (High-Definition Multimedia Interface) port, or the like. After the external connection apparatus 929 is connected to the connection port 923, the information processing apparatus 900 directly obtains various kinds of data from the external connection apparatus 929, or provides various kinds of data to the external connection apparatus 929.

The communicating device 925 is, for example, a communication interface including a communicating device or the like for connection to a communication network (network) 931. The communicating device 925 is, for example, a communication card or the like for a wired or wireless LAN (Local Area Network), Bluetooth (registered trademark), or WUSB (Wireless USB). In addition, the communicating device 925 may be a router for optical communication, a router for ADSL (Asymmetric Digital Subscriber Line), modems for various kinds of communication, or the like. The communicating device 925 can, for example, transmit and receive a signal or the like to and from the Internet or another communicating apparatus in conformity with a predetermined protocol such as TCP/IP, for example. In addition, the communication network 931 connected to the communicating device 925 is formed by a network connected by wire or radio or the like. The communication network 931 may, for example, be the Internet, a home LAN, infrared communication, radio wave communication, satellite communication, or the like. Incidentally, the wireless communication section 2003 described above with reference to FIG. 2 can be implemented by the communicating device 925, for example.

An example of a hardware configuration that can implement functions of the information processing apparatus 900 constituting the imaging system according to the embodiment of the present disclosure has been illustrated above. Each of the above-described constituent elements may be formed by using a general-purpose member, or may be formed by hardware specialized in the functions of each constituent element. Hence, the hardware configuration to be used can be changed as appropriate according to technology levels at times of carrying out the present embodiment. Incidentally, though not illustrated in FIG. 13, various kinds of configurations corresponding to the information processing apparatus 900 constituting the imaging system according to the present embodiment are of course provided.

Incidentally, a computer program for implementing each function of the information processing apparatus 900 constituting the imaging system according to the present embodiment as described above can be prepared and implemented in a personal computer or the like. In addition, a computer readable recording medium storing such a computer program can be provided. The recording medium is, for example, a magnetic disk, an optical disk, a magneto-optical disk, a flash memory, or the like. In addition, the above-described computer program may, for example, be distributed via a network without the use of the recording medium. In addition, the number of computers that execute the computer program is not particularly limited. For example, the computer program may be executed by plural computers (for example, plural servers or the like) cooperating with each other. Incidentally, a singular computer or plural computers cooperating with each other are also referred to as a "computer system."

6. APPLICATION EXAMPLE

Next, an example of devices other than a communication terminal such as a smart phone will be described as an example of application of the communicating device according to one embodiment of the present disclosure.

In recent years, a technology that connects various things to a network, which technology is referred to as IoT (Internet of Things), has been drawing attention, and a case in which a device other than a smart phone or a tablet terminal can also be used for communication is assumed. Thus, when the technology according to the present disclosure is applied to various kinds of devices configured to be movable, for example, the devices can also perform communication using millimeter waves.

Figure 14:
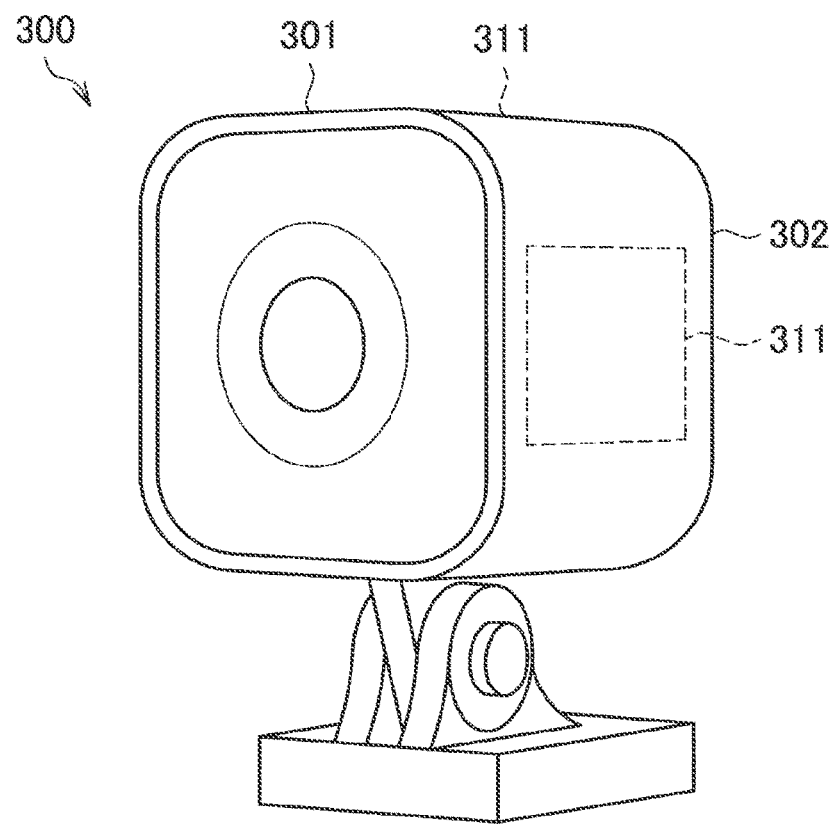
FIG. 14 is an explanatory diagram of assistance in explaining an example of application of the communicating device according to the same embodiment.

For example, FIG. 14 is an explanatory diagram of assistance in explaining an example of application of the communicating device according to the present embodiment. FIG. 14 illustrates an example of a case where the technology according to the present disclosure is applied to a camera device. Specifically, in the example illustrated in FIG. 14, an antenna unit according to one embodiment of the present disclosure is retained so as to be located in the vicinity of each of surfaces 301 and 302 facing directions different from each other among external surfaces of the casing of a camera device 300. Reference sign 311, for example, schematically denotes an antenna unit according to one embodiment of the present disclosure. With such a configuration, in each of the surfaces 301 and 302, for example, the camera device 300 illustrated in FIG. 14 can transmit or receive a radio signal propagating in a direction substantially coinciding with the normal direction of the surface. Incidentally, it is needless to say that the antenna unit 311 may be provided also to other surfaces without being limited to only the surfaces 301 and 302 illustrated in FIG. 14. Under such a configuration, the processing related to diagnosis of each antenna unit 311 (that is, communicating units) may be performed on the basis of the above-described technology.

Figure 15:
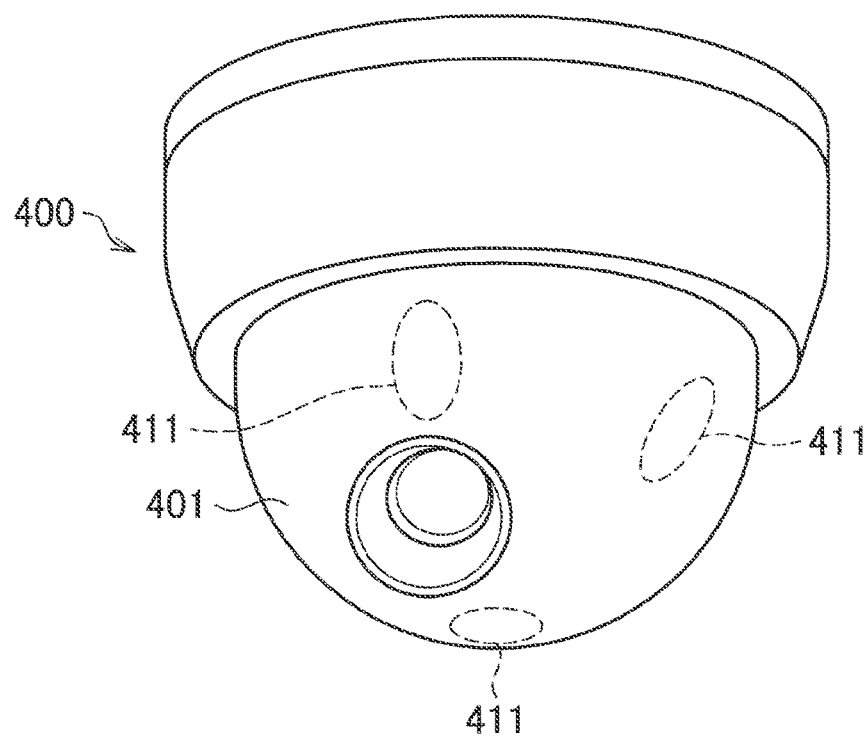
FIG. 15 is an explanatory diagram of assistance in explaining an example of application of the communicating device according to the same embodiment.

In addition, as described earlier, the technology according to the present disclosure can be applied also to unmanned aircraft referred to as a drone or the like. For example, FIG. 15 is an explanatory diagram of assistance in explaining an example of application of the communicating device according to the present embodiment. FIG. 15 illustrates an example of a case where the technology according to the present disclosure is applied to a camera device installed in a lower portion of the drone. Specifically, in the case of the drone that flies high, it is desirable that a radio signal (millimeter wave) arriving from each direction can be transmitted or received mainly on a lower side. Thus, in the example illustrated in FIG. 15, for example, an antenna unit according to one embodiment of the present disclosure is retained so as to be located in the vicinity of each of parts facing directions different from each other in an external surface 401 of the casing of a camera device 400 installed in the lower portion of the drone. For example, reference sign 411 schematically denotes an antenna unit according to one embodiment of the present disclosure. In addition, while not illustrated in FIG. 15, antenna units 411 may, for example, be provided not only to the camera device 400, but also to various parts of the casing of the drone itself. Also in this case, antenna units 411 are preferably provided particularly to the lower side of the casing. Under such a configuration, the processing related to diagnosis of each antenna unit 411 (that is, communicating units) may be performed on the basis of the above-described technology.

Incidentally, in a case where at least a part of the external surface of the casing of the target device is formed as a curving surface (that is, a curved surface), as illustrated in FIG. 15, an antenna unit 411 is preferably retained in the vicinity of each of plural partial regions having normal directions intersecting each other or having the normal directions in mutually twisted positions among partial regions in the curving surface. Such a configuration enables the camera device 400 illustrated in FIG. 15 to transmit or receive a radio signal propagating in a direction substantially coinciding with the normal direction of each partial region.

It is to be noted that the examples described with reference to FIG. 14 and FIG. 15 are mere examples, and that a target for the application of the technology according to the present disclosure is not particularly limited as long as the device performs communication using millimeter waves.

In the above, referring to FIG. 14 and FIG. 15, description has been made of an example of cases where the technology according to the present disclosure is applied to devices other than a communication terminal such as a smart phone as an example of application of the communicating device to which the antenna unit according to one embodiment of the present disclosure is applied.

7. CONCLUSION

As described above, in a system according to one embodiment of the present disclosure, a communicating device (terminal device 200) includes plural communicating units, a casing, and a communication control section. The plural communicating units each communicate with another communicating device via a wireless communication path. The casing supports the plural communicating units such that the p plural communicating units respectively receive radio signals arriving from directions relatively different from each other. The communication control section controls operation of each of the plural communicating units. In addition, the communication control section performs control such that priority is given to reception of a radio signal by a target communicating unit among the plural communicating units, and the communication control section controls execution of processing related to diagnosis of the communicating unit in question on the basis of a result of the reception.

With the configuration as described above, in a case where a failure occurs in some of the plural communicating units, the failure in the communicating unit in question can be detected in a more suitable mode. That is, the communicating device according to one embodiment of the present disclosure can realize the diagnosis of operation of each communicating unit in a more suitable mode under conditions where the plural communicating units are used for wireless communication.

Preferred embodiments of the present disclosure have been described above in detail with reference to the accompanying drawings. However, the technical scope of the present disclosure is not limited to such examples. It is obvious that a person having an ordinary knowledge in the technical field of the present disclosure can conceive of various changes or modifications within the scope of technical concepts described in claims. It is therefore to be understood that these changes or modifications also naturally fall within the technical scope of the present disclosure.

In addition, effects described in the present specification are merely exemplary or illustrative, and are not restrictive. That is, the technology according to the present disclosure can produce other effects obvious to those skilled in the art from the description of the present specification together with the above-described effects or in place of the above-described effects.

It is to be noted that the following configurations also belong to the technical scope of the present disclosure.

(1)

A communicating device including:

plural communicating units each configured to communicate with another communicating device via a wireless communication path;

a casing configured to support the plural communicating units such that the plural communicating units respectively receive radio signals arriving from directions relatively different from each other; and a communication control section configured to control operation of each of the plural communicating units, the communication control section performing control such that priority is given to reception of a radio signal by a target communicating unit among the plural communicating units, and controlling execution of processing related to diagnosis of the communicating unit in question, on the basis of a result of the reception.

(2)

The communicating device according to the above (1), in which, in a case where a first communicating unit among the plural communicating units is receiving a radio signal, the communication control section suppresses reception of a radio signal by a second communicating unit different from the first communicating unit among the plural communicating units, and the communication control section controls execution of the processing related to the diagnosis of the first communicating unit, on the basis of a result of reception of the radio signal by the first communicating unit.

(3)

The communicating device according to the above (2), including:

a notification control section configured to perform control so as to give notification of notification information providing guidance for changing a posture of the casing via a predetermined output unit, in which, in a case where the first communicating unit receives the radio signal according to a change in the posture of the casing after notification of the notification information is given, the communication control section suppresses the reception of the radio signal by the second communicating unit.

(4)

The communicating device according to the above (3), in which the notification control section performs control so as to give notification of the notification information providing guidance for changing the posture of the casing, such that a communicating unit not set as a target for the processing related to the diagnosis among the plural communicating units becomes able to receive a radio signal.

(5)

The communicating device according to any one of the above (1) to (4), in which the communicating units are configured to be able to control patterns of directional beams related to reception of the radio signals, and the communication control section performs control such that the number of beam patterns used by the target communicating unit among the plural communicating units to receive the radio signal for the diagnosis is larger than the number of beam patterns used by another communicating unit.

(6)

The communicating device according to any one of the above (1) to (5), in which the communication control section controls the execution of the processing related to the diagnosis of the communicating unit in question, on the basis of a result of reception of a downlink signal transmitted from a base station by the communicating unit.

(7)

The communicating device according to the above (6), in which the base station transmits the downlink signal while selectively switching among plural beam patterns, and the communication control section controls the execution of the processing related to the diagnosis, on the basis of the result of reception of the downlink signal transmitted from the base station in any one of the plural beam patterns.

(8)

The communicating device according to the above (6) or (7), in which the communication control section controls the execution of the processing related to the diagnosis using the result of reception of the downlink signal transmitted from the base station, in a case where the communicating device is located within a coverage of the base station.

(9)

The communicating device according to any one of the above (1) to (5), in which the communication control section controls the execution of the processing related to the diagnosis of the target communicating unit among the plural communicating units, on the basis of a result of reception of a reflected wave of a radio signal transmitted from at least any one of the plural communicating units.

(10)

The communicating device according to any one of the above (1) to (9), in which the communication control section determines the communicating unit as a target for the diagnosis, according to a history of communication by at least any one of the plural communicating units.

(11)

The communicating device according to any one of the above (1) to (9), in which the communication control section determines the communicating unit as a target for the diagnosis, according to a frequency at which at least any one of the plural communicating units is used for communication.

(12)

The communicating device according to any one of the above (1) to (9), in which the communication control section determines the communicating unit as a target for the diagnosis, according to a frequency of occurrence of an error related to communication by at least any one of the plural communicating units.

(13)

The communicating device according to any one of the above (1) to (12), in which, in a case where a radio signal in a predetermined frequency band is receivable, the communication control section controls the execution of the processing related to the diagnosis using a result of reception of the radio signal.

(14)

The communicating device according to any one of the above (1) to (13), in which
the casing includes a movable portion, and
the communication control section controls the execution of the processing related to the diagnosis, according to a state of the movable portion.

(15)

A control device including:
a communication control section configured to control operation of each of plural communicating units supported so as to receive radio signals arriving from directions relatively different from each other,
the communication control section
performing control such that priority is given to reception of a radio signal by a target communicating unit among the plural communicating units, and
controlling execution of processing related to diagnosis of the communicating unit in question, on the basis of a result of the reception.

(16)

A control method including:
by a computer,
controlling operation of each of plural communicating units supported so as to receive radio signals arriving from directions relatively different from each other,
control being performed such that priority is given to reception of a radio signal by a target communicating unit among the plural communicating units,
execution of processing related to diagnosis of the communicating unit in question being controlled on the basis of a result of the reception.

REFERENCE SIGNS LIST

1: System
100: Base station
200: Terminal device
220: Communicating unit
2001: Antenna section
2003: Wireless communication section
2005: Control section
2007: Storage section
2009: Notifying section
2011: Detecting section
2013: Communication control section
2015: Determining section
2017: Notification control section

The invention claimed is:

1. A first communicating device, comprising:
plural antenna devices configured to receive radio signals from different directions, wherein
each antenna device of the plural antenna devices is configured to communicate with a second communicating device via a wireless communication path, and
the second communicating device corresponds to a base station;
a casing configured to support the plural antenna devices; and
circuitry configured to:
control operation of each antenna device of the plural antenna devices;
prioritize a target antenna device among the plural antenna devices to receive, from the second communicating device, a radio signal of the radio signals, wherein the radio signal corresponds to a downlink signal;
control the target antenna device to receive a reference signal from the second communicating device;
execute, based on the reception of the radio signal and the reference signal by the target antenna device, a process related to diagnosis of the target antenna device,
wherein the process related to the diagnosis includes measurement of reception strength of the downlink signal;
determine, based on sub-carrier intervals within which the reference signal is transmitted from the second communicating device, a measurement period for the measurement of the reception strength;
determine that the target antenna device is operating normally in a case where the reception strength is equal to or higher than a threshold value; and
determine that an abnormality has occurred in the target antenna device in a case where the reception strength is lower than the threshold value.

2. The first communicating device according to claim 1, wherein in a case where the target antenna device receives the radio signal, the circuitry is further configured to suppress reception of the radio signal by a first antenna device different from the target antenna device among the plural antenna devices.

3. The first communicating device according to claim 2, wherein
the circuitry is further configured to control a display screen to display notification information to provide guidance to change a posture of the casing, and
in a case where the first antenna device receives the radio signal based on the change in the posture of the casing after the notification information is displayed, the circuitry is further configured to suppress the reception of the radio signal by the target antenna device.

4. The first communicating device according to claim 1, wherein
each antenna device of the plural antenna devices is further configured to control beam patterns related to the reception of the radio signals, and
the circuitry is further configured to control the operation of the target antenna device such that a number of the beam patterns used by the target antenna device for the diagnosis is larger than a number of the beam patterns used by a first antenna device among the plural antenna devices.

5. The first communicating device according to claim 1, wherein
the base station selectively switches among plural beam patterns to transmit the downlink signal, and
the circuitry is further configured to execute the process related to the diagnosis, based on the downlink signal transmitted from the base station in one of the plural beam patterns.

6. The first communicating device according to claim 1, wherein the circuitry is further configured to execute the process related to the diagnosis based on the downlink signal from the base station, in a case where the first communicating device is located within a coverage of the base station.

7. The first communicating device according to claim 1, wherein the circuitry is further configured to execute the process related to the diagnosis, based on reception of a reflected wave of the radio signal transmitted from at least one of the plural antenna devices.

8. The first communicating device according to claim 1, wherein the circuitry is further configured to determine the target antenna device for the diagnosis, based on a history of the communication by at least one of the plural antenna devices.

9. The first communicating device according to claim 1, wherein the circuitry is further configured to determine the target antenna device for the diagnosis, based on a frequency at which at least one of the plural antenna devices is used for the communication.

10. The first communicating device according to claim 1, wherein the circuitry is further configured to determine the target antenna device for the diagnosis, based on a frequency of occurrence of an error related to the communication by at least one of the plural antenna devices.

11. The first communicating device according to claim 1, wherein, in a case where the radio signal in a specific frequency band is receivable, the circuitry is further configured to execute, based on the reception of the radio signal in the specific frequency band, the process related to the diagnosis.

12. The first communicating device according to claim 1, wherein
the casing includes a movable portion, and
the circuitry is further configured to execute, based on a state of the movable portion, the process related to the diagnosis.

13. A control device, comprising:
circuitry configured to:
control operation of each antenna device of plural antenna devices supported by a casing,
wherein the plural antenna devices receive radio signals from different directions;
prioritize a target antenna device among the plural antenna devices to receive, from a base station, a radio signal of the radio signals,
wherein the radio signal corresponds to a downlink signal;
control the target antenna device to receive a reference signal from the base station;
execute, based on the reception of the radio signal and the reference signal by the target antenna device, a process related to diagnosis of the target antenna device,
wherein the process related to the diagnosis includes measurement of reception strength of the downlink signal;
determine, based on sub-carrier intervals within which the reference signal is transmitted from the base station, a measurement period for the measurement of the reception strength;
determine that the target antenna device is operating normally in a case where the reception strength is equal to or higher than a threshold value; and
determine that an abnormality has occurred in the target antenna device in a case where the reception strength is lower than the threshold value.

14. A control method, comprising:
controlling operation of each antenna device of plural antenna devices supported by a casing,
wherein the plural antenna devices receive radio signals from different directions;
prioritizing a target antenna device among the plural antenna devices to receive, from a base station, a radio signal of the radio signals,
wherein the radio signal corresponds to a downlink signal;
controlling the target antenna device to receive a reference signal from the base station;
executing, based on the reception of the radio signal and the reference signal by the target antenna device, a process related to diagnosis of the target antenna device,
wherein the process related to the diagnosis includes measuring reception strength of the downlink signal;
determining, based on sub-carrier intervals within which the reference signal is transmitted from the base station, a measurement period of the measurement of the reception strength;
determining that the target antenna device is operating normally in a case where the reception strength is equal to or higher than a threshold value; and
determining that an abnormality has occurred in the target antenna device in a case where the reception strength is lower than the threshold value.

* * * * *